United States Patent [19]
Hatanaka

[11] Patent Number: 5,923,573
[45] Date of Patent: Jul. 13, 1999

[54] THREE-DIMENSIONAL CAD SYSTEM FOR PRODUCING A THREE-DIMENSIONAL MODEL

[75] Inventor: Masashi Hatanaka, Rancho Palos Verdes, Calif.

[73] Assignee: Honda Giken Kogyo Kabushikikaisha, Japan

[21] Appl. No.: 08/866,836

[22] Filed: May 30, 1997

[30] Foreign Application Priority Data

Jun. 3, 1996 [JP] Japan ..................................... 8-140381

[51] Int. Cl.⁶ ..................................................... G06F 17/50
[52] U.S. Cl. .................... 364/578; 364/191; 364/474.24; 364/512; 345/420; 345/441; 345/964; 706/919
[58] Field of Search .............................. 364/578, 571.01, 364/474.24, 552, 512, 191; 706/919; 345/420, 441, 964

[56] References Cited

U.S. PATENT DOCUMENTS

| | | | |
|---|---|---|---|
| 4,937,768 | 6/1990 | Carver et al. | 364/571.01 |
| 5,003,498 | 3/1991 | Ota et al. | 364/552 |
| 5,023,800 | 6/1991 | Carver et al. | 364/474.24 |
| 5,033,014 | 7/1991 | Carver et al. | 364/571.01 |
| 5,465,221 | 11/1995 | Merat et al. | 364/552 |
| 5,627,949 | 5/1997 | Letcher, Jr. | 395/120 |
| 5,815,154 | 9/1998 | Hirschtick et al. | 345/356 |
| 5,850,535 | 12/1998 | Maystrovsky et al. | 395/500 |
| 5,856,828 | 1/1999 | Letcher, Jr. | 345/420 |

FOREIGN PATENT DOCUMENTS

| | | | |
|---|---|---|---|
| 7-249133 | 9/1995 | Japan | G06T 17/00 |
| 7-254075 | 10/1995 | Japan | G06T 17/00 |
| 7-296039 | 11/1995 | Japan | G06F 17/50 |

OTHER PUBLICATIONS

M. Marefat et al., Building Semantic Descriptions from Boundary Data, Systems Engineering, 1990 IEEE International Conference, pp. 577–580.

I. C. You et al., Three–Dimensional Net Shape Analysis for Manufacturability Evaluation, Systems, Manufacturing and Cybernetics, IEEE 1990 International Conference, pp. 715–720.

L. Stark et al., Genereic Recognition Through Qualitative Reasoning About 3–D Shape and Object Function, Computer Vision and Pattern Recognition, IEEE 1991 (CVPR), pp. 251–256.

W. Wang et al., Efficient Data Structures for Model–Based #–D Object Recognition and Localization from Range Images, IEEE Transactions on Pattern Analysis and Machine Intelligence, vol. 4, No. 10, Oct. 1992, pp. 1035–1045.

L. Grewe et al., Interactive Learning of Multiple Attribute Hash Table for Fast 3D Object Recognition, CAD–Based Workshop, IEEE 1994 Workshop, pp. 17–27.

Y. He et al., A Virtual Prototype Manufacturing Software System for MEMS, Micro Electro Mechanical Systems, IEEE 1996 Workshop, pp. 122–126.

*Primary Examiner*—Kevin J. Teska
*Assistant Examiner*—Russell W. Frejd
*Attorney, Agent, or Firm*—Fenwick & West, LLP

[57] ABSTRACT

Kit models stored in the storage are displayed on a display by the display unit. The kit model being displayed has geometric shape data such as points, curved lines and curved surfaces as well as correlation data which indicates correlation of the geometric shape data. Responsive to modification information, a modification unit modifies the kit model. When a curved line which is included in the geometric shape data is modified, other curved lines which intersect the modified curved line as well as other components such as curved surfaces which include the modified curved line as a boundary line are detected based on the correlation data and are associatively modified. The modification unit moves or changes the object line based on the modification data, and associatively modifies, as the object line is modified, all points, curved lines and curved surfaces which intersect the object line. Thus, a three-dimensional model is formed by modifying kit models stored in a memory.

12 Claims, 22 Drawing Sheets

Curved surface and boundary curved lines

Variable offsets modification of a curved line

Function table

| | |
|---|---|
| 'Generation of a curved line by interpolation of a group of points' | ph – bs – cub – intp |
| 'Offset movement of a group of points' | ph – cpl – offset – move |
| ⋮ | ⋮ |

Fig.13

THREE-DIMENSIONAL CAD SYSTEM FOR PRODUCING A THREE-DIMENSIONAL MODEL

BACKGROUND OF THE INVENTION

1. Field of the Invention

The present invention relates to a CAD (Computer Aided Design) system, a method of producing a three-dimensional model using the CAD system, and a storage media which stores programs for producing a three-dimensional model.

2. Description of Related Art

Japanese Patent Application Publication (Kokai) No.7-249133 describes a three-dimensional CAD system for forming a stereoscopic model for an specific article for which many kinds of variations exist.

According to the above referenced patent publication, a shape model of a three-dimensional article is produced with a system having a unit for dividing a similarly configured article into a plurality of representative portions, a unit for classifying partial shapes into qualitative shapes, a database for standardizing and registering the classified qualitative shapes, and a unit for defining dimensional relationship of the classified qualitative shapes in terms of parameters and for assigning dimensions.

The above identified patent publication discloses a method of producing a three-dimensional model of a new conrod by dividing a conrod 400 as shown in FIG. 22 into three parts, a larger end part 401, a neck 402, and a smaller end part 403, providing ten-odd kinds of qualitative shapes to each part, and inputting values of relative dimensions defined as parameters of these qualitative shapes.

Parametric designing is also described in Japanese Patent Application Publication (Kokai) Nos. 7-254075 and 7-296039.

In the prior art, when there are registered qualitative shapes, any partial shapes can be obtained by inputting values of relative dimensions in terms of parameters, and three-dimensional models are obtained by combining the partial shapes. As regards the shapes which are not registered, however, all of shapes must be input and then registered into a database to generate a three-dimensional model. As such, it is not easy to form a three-dimensional model other than by using old shapes to create similar shapes.

Further, as to difference of the shapes of minute portions of a stored shape, if a first curved line of included in the shape data is modified, other curved lines which intersect the first curved line as well as curved surfaces whose boundary lines include the first curved line need to be modified, which is cumbersome.

SUMMARY OF THE INVENTION

It is an object of the present invention to resolve such a problem and to provide a three-dimensional CAD system for generating a three-dimensional model, a method of producing a three-dimensional model and a storage media for producing a three-dimensional model.

So as to resolve the problem described above, a three-dimensional CAD system according to the present invention includes a storage for storing a plurality of kit models which indicate geometric figures of an article to be designed, a display unit for reading the kit models stored in the storage and displaying it on a display, an input unit for receiving modification information which specify changes to be made to the kit models displayed on the display, and a modification unit for modifying the kit model based on the modification information received by the input unit, wherein the kit models contain geometric shape data such as points, curved lines and curved surfaces which constitute the kit models as well as correlation data which indicates the correlation of the geometric shape data.

According to the three-dimensional CAD system of the present invention, the kit models stored in the storage are displayed on a display by the display unit. The kit model being displayed has geometric shape data such as points, curved lines and curved surfaces as well as correlation data which indicates correlation of the geometric shape data. A designer inputs modification information in order to modify a kit model displayed on the display. The modification data is received by the input unit and is provided to the modification unit. The modification unit modifies the kit model based on the modification information. Thus, a desired three-dimensional model is formed.

Modifying the kit model which has geometric shape data and correlation data for designing significantly improves efficiency of designing operation. That is, when a predetermined curved line which is included in the geometric shape data is modified, other curved lines which intersect the modified curved line as well as other components such as curved surfaces which include the modified curved line as a boundary line are readily detected based on the correlation data. As a result, other elements such as curved lines which correlate with the modified curved line can readily be modified.

The modification information received by the input unit includes information for moving or changing an object line which is selected from curved lines of the kit model. The modification unit moves or changes the object line based on the modification data, and preferably associatively modifies, as the object line is modified, all points, curved lines and curved surfaces which intersect the object line.

Also, the modification information received by the input unit includes information for adding or deleting an object line to or from the kit model. The modification unit adds or deletes the object line to or from the kit model based on the modification data, and preferably modifies, as the object line is modified, all points, curved lines and curved surfaces which intersect the object line.

The correlation data includes data for indicating use and used relationship between a curved surface of the kit model and a curved line which is a boundary line of the curved surface, as well as data indicating use and used relationship between the curved line of the boundary line and points on the curved line. The modification unit preferably modifies the kit model based on the correlation data.

Further, a method of producing a three-dimensional model according to the present invention uses geometric shape data such as points, curved lines and curved surfaces and correlation data indicating correlation of the geometric shape data, and includes a first step of displaying on a display a kit model indicating geometric figures of an object being designed, a second step of receiving modification information which specify changes to be made to the kit model displayed on the display, and a third step of modifying the kit model based on the modification information.

The modification information received by the second step is information for moving or changing an object line which is selected from curved lines of a kit model. The third step adds or deletes the object line based on the modification data, and preferably associatively modifies, as the object line is modified, all points, curved lines and curved surfaces which intersect the object line.

The modification information received by the second step is information for adding or deleting an object line to or from the kit model. The third step adds or deletes the object line to or from the kit model based on the modification data, and preferably associatively modifies, as the object line is modified, all points, curved lines and curved surfaces which intersect the object line.

The correlation data includes data for indicating use and used relation between a curved surface of the kit model and a curved line which is a boundary line of the curved surface, and data for indicating use and used relation between the curved line, which is a boundary line, and points on the curved line. The third step preferably modifies the kit model based on the correlation data.

Further, a storage media for producing a three-dimensional model according to the present invention is a storage media which has a data area for storing data and a program area for storing programs. Such data and programs can be read out and the programs are executed in accordance with the data. The data area stores a kit model showing a geometric figure of an object of designing in terms of geometric shape data such as points, curved lines and curved surfaces and correlation data indicating correlation of the geometric shape data. The program area stores programs for producing a three-dimensional model. The programs include a display routine for displaying a kit model on a display, an input routine for receiving modification information for modifying the kit mode based on the kit model displayed on the display, and a modification routine for modifying the kit model based on the modification information which is received by the input routine.

A storage media for producing a three-dimensional model according to the present invention can be accommodated in an information processor which reads out the kit model stored in the data area and the programs stored in the program area and executes the program.

That is, the kit model is displayed on the display by execution of the display routine. The kit model being displayed includes geometric shape data such as points, curved lines and curved surfaces of the kit model as well as correlation data which indicates the correlation of the geometric shape data. When modification information is input by a designer to modify the kit model displayed on the display, the modification data is received by the input routine and is provided to the modification routine. The modification routine modifies the kit model based on the modification information to form a desired three-dimensional model.

Designing by modifying the kit model which has the geometric shape data and the correlation data significantly improves efficiency of designing operation. For example, when a predetermined curved line of the geometric shape data is modified, other elements such as curved lines which intersect the curved line and curved surfaces which includes the modified curved line as a boundary can be readily detected and modified.

The modification information received by the input routine includes information for moving or changing the object line which is selected from the curved lines of the kit model. The modification routine adds or deletes the object line based on the modification data, and preferably associatively modifies, as the object line is modified, all points, curved lines and curved surfaces which intersect the object line.

Also, the modification information received by the input routine includes information for adding or deleting an object line to or from the kit model. The modification routine adds or deletes the object line to or from the kit model based on the modification data, and preferably associatively modifies, as the object line is modified, all points, curved lines and curved surfaces which intersect the object line.

The correlation data includes data indicating use and used relation between a curved surface of the kit model and a curved line of a boundary line of the curved surface, as well as data indicating use and used relation between the curved line of the boundary line and points on the curved line. The modification routine preferably modifies the kit model based on the correlation data.

BRIEF DESCRIPTION OF THE DRAWINGS

FIG. 13 is diagram showing a detail of a function table.

DESCRIPTION OF THE PREFERRED EMBODIMENT

Preferred embodiment of the invention is described below with reference to accompanying drawings. The same numerals are used to the same elements, and duplicated description is omitted.

1. Three-Dimensional CAD System

Figure 1:
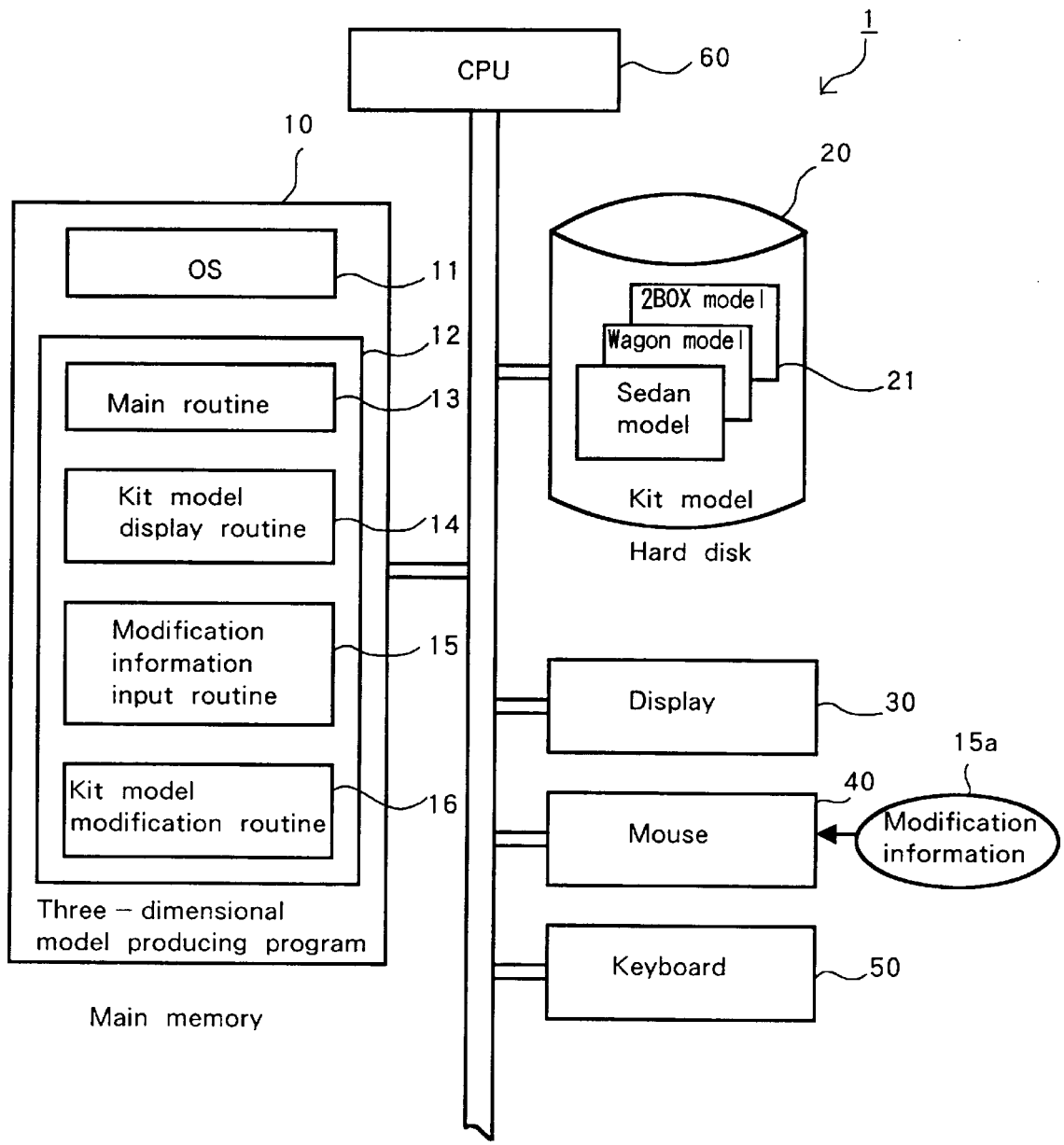
FIG. 1 is a block diagram of a preferred embodiment of a CAD system according to the invention.

FIG. 1 is a block diagram showing a three-dimensional CAD system 1 of a preferred embodiment. As shown in FIG. 1, the three-dimensional CAD system 1 includes a main memory 10 which stores an operating system 11 and a program 12 for producing a three-dimensional model, a hard disk (storage unit) 20 which stores kit models 21 representing geometric structures of object articles to be designed, and a display 30 for displaying the kit models 21. The three-dimensional CAD system 1 also includes a mouse 40 for entering modification information 15a of the kit model 21 being displayed on the display 30, a keyboard 50 for entering dimension value data of the kit models 21, and a CPU 60 for controlling execution of the program 12 for producing three-dimensional models and performing other operations.

The program 12 includes a main routine 13 for organizing processes, and a kit model display routine (display unit) 14 for reading out the kit models 21 from the hard disk 20 and display them on the display 30 which may be any one of conventional displays such as a CRT display and a liquid crystal display (LCD). The program 12 also includes a modification information input routine (input unit) 15 for receiving modification information 15a for the kit model 21 which is entered by a designer, and a kit model modification routine (modification unit) 16 for modifying the kit model based on the modification information 15a.

Figure 2:
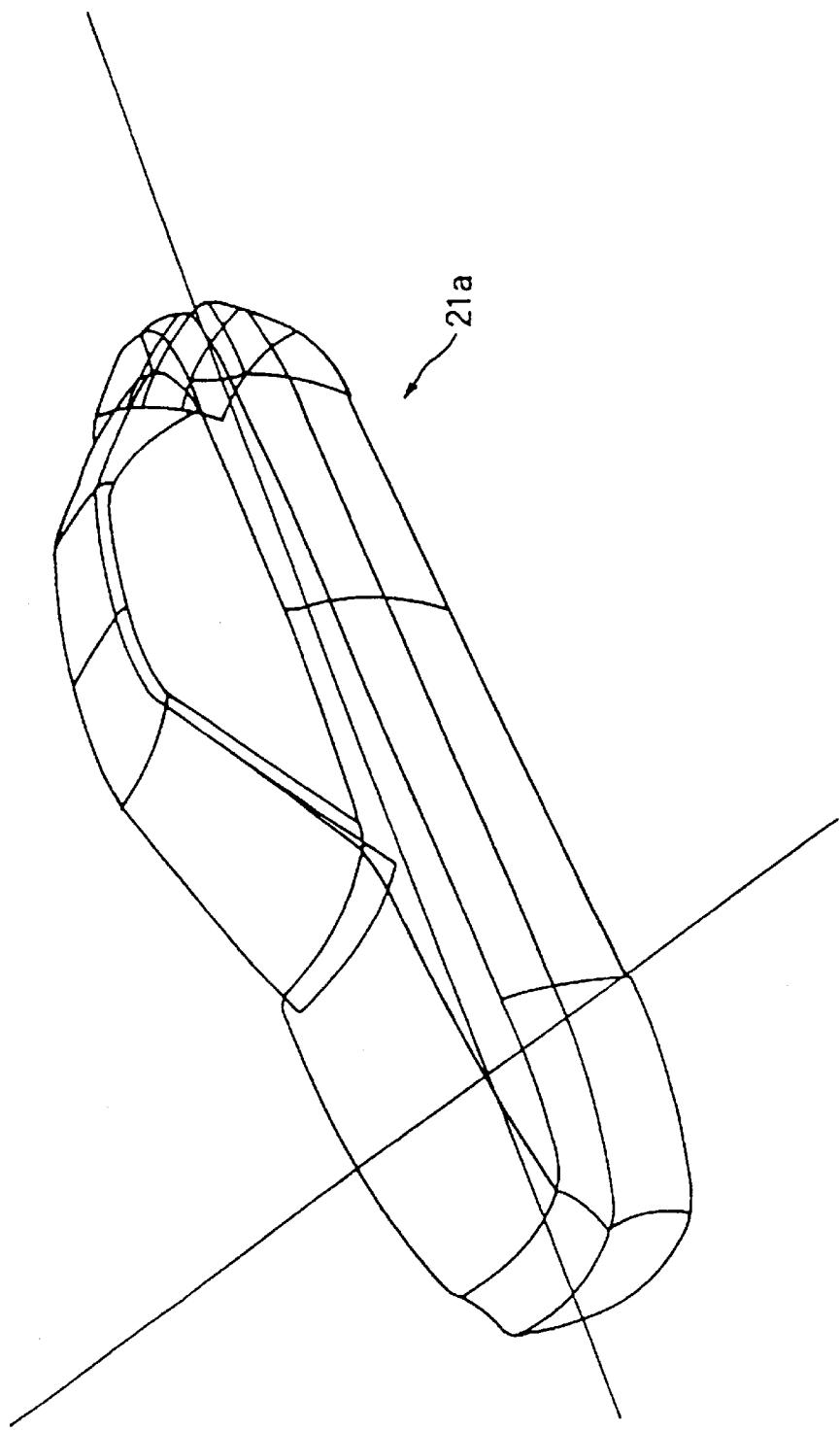
FIG. 2 is a diagram showing a sedan type model of a kit model.
Figure 3:
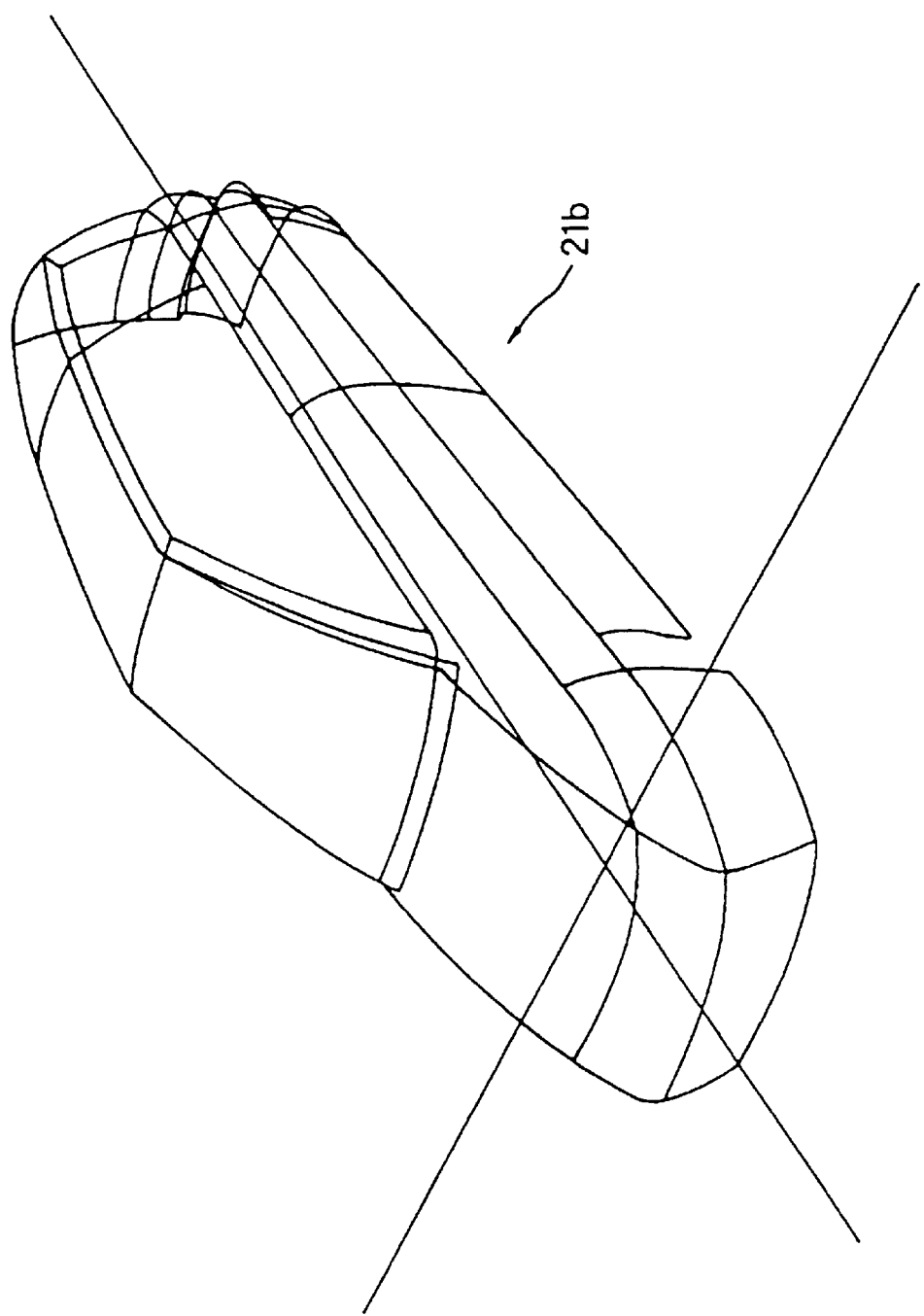
FIG. 3 is a diagram showing a wagon type model of a kit model.

The kit model 21 is a three-dimensional wire frame model formed by a group of lines of a primitive skeleton which indicate major characteristics of the shape. Each primitive skeleton line of the kit model 21 intersects other lines. Four lines which intersect each other generate a curved surface in each portion. As examples of kit models 21 of an automobiles, FIG. 2 shows a sedan type model 21a and FIG. 3 shows a wagon type model 21b. Objects to be designed by the kit model 21 are not only automobiles but such articles as furniture including desks and chairs, OA equipment including computers and telephones may also be designed with the present invention.

2. Method of Producing a Three-Dimensional Model

Figure 4:
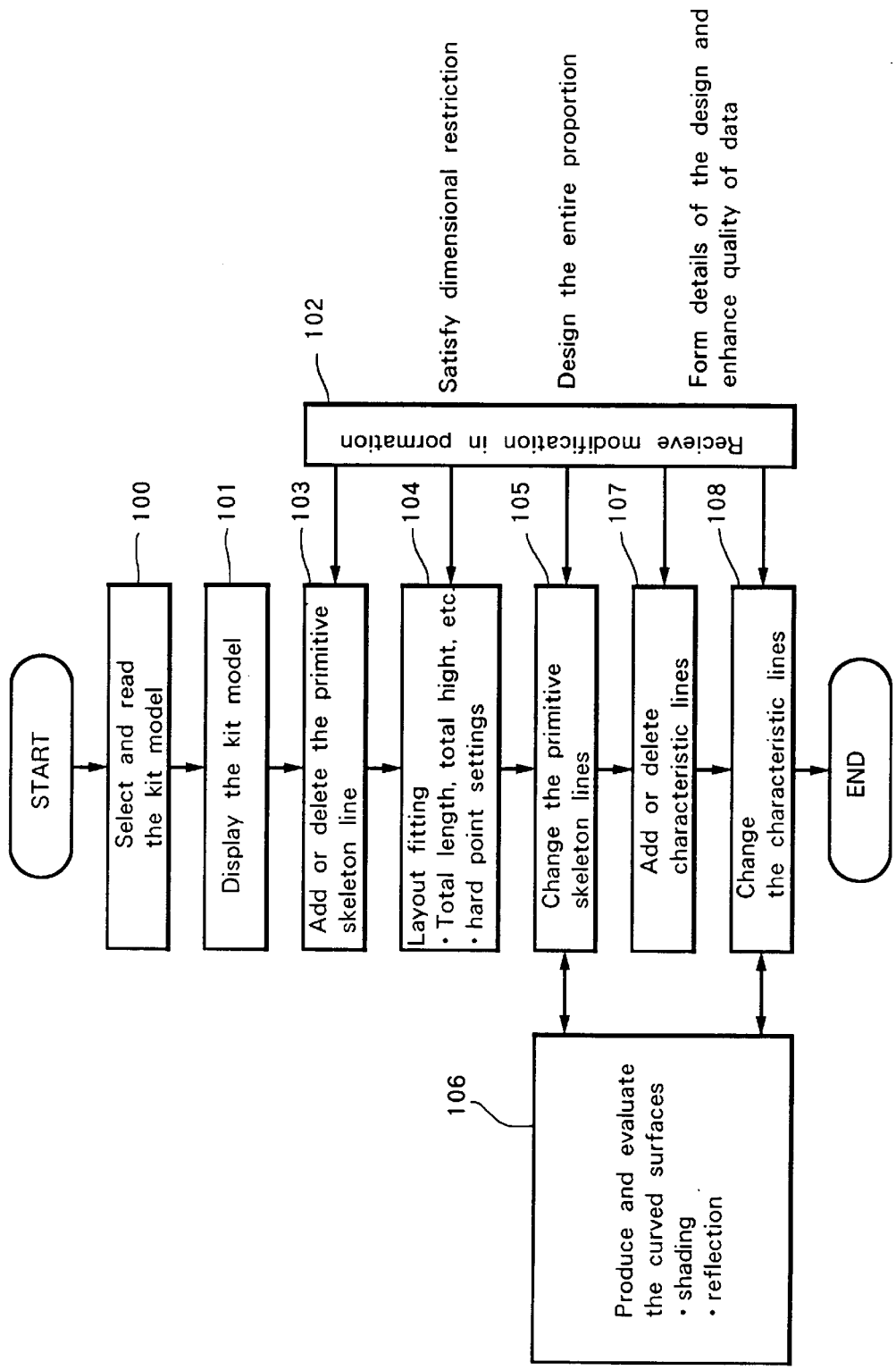
FIG. 4 is a flowchart showing an embodiment of a method of producing a three-dimensional model according to the invention.

A method of producing a three-dimensional model using the three-dimensional CAD system is described below with reference to FIG. 1 and FIG. 4. Designing operation of an automobile is used as an example. As shown, the main routine 13 is initiated under the control of the OS(Operating System) 11 and the kit model 21 which is most similar to an object to be designed is read out from the hard disk 20 (step 100). The kit model display routine 14 displays the kit model 21 on the display 30 (step 101).

Then, operations from step 102 to step 106 are performed to modify roughly the overall primitive skeleton lines of the kit model 21. The primitive skeleton lines are significant lines which represent design characteristics. By modifying design taste (tendency of shapes) of the lines, desired lines are produced and a proportion of the entire model is created by producing curved surfaces and evaluating the shape. Such operations correspond to sketching an image onto a paper or defining a line shape using various rulers in the prior art.

To modify the entire primitive skeleton lines, a designer watches a kit model 21 displayed on a display 30 and first inputs modification information 15a using a mouse 40. The modification information 15a is received by a modification information input routine 15 (step 102). Specifically, when the designer moves a cursor using the mouse 40 to draw a curved line in the primitive skeleton lines of the kit model 21, the curved line is specified as an object line to be added.

Also, when the designer moves the cursor to a primitive skeleton line of the kit model 21 using the mouse 40 and clicks the mouse 40, the primitive skeleton line is specified as an object line to be deleted or changed. When the designer moves the cursor to a primitive skeleton line of the kit model 21 using the mouse 40 and clicks the mouse 40 and drags it, the primitive skeleton line is moved to a location where it is dragged.

The object line is added or deleted by a kit model modification routine 16 based on the modification information 15a received by the modification information input routine 15 (step 103). Layout fitting of the kit model 21 is performed to move the intersection points of the primitive skeleton lines to the locations which satisfy a layout drawing (step 104). That is, when a location of the intersection point of the primitive skeleton lines of the kit model is changed, all primitive skeleton lines which relate to the intersection point are associatively changed as the intersection point moves. The intersection points of the primitive skeleton lines are fundamental hard point settings in designing and are determined from a basic layout of an automobile which layout is determined through evaluation of total length, total width, the space of an engine room, the space of passenger room, and several other items.

The object line is changed by the kit model modification routine 16 based on the modification information 15a received by the modification information input routine 15 (step 105). Then, the entire proportion of the model is designed by producing curved surfaces and evaluating shapes (step 106). That is, the kit model 21 is formed of the primitive skeleton lines and the intersection points and has intersected four lines (boundary curved lines) such that a curved surface may be formed. Therefore, by tracing the relationship between the intersection points and the primitive skeleton lines, the system can see a closed region for forming a curved surface, and a curved surface is automatically generated. Concurrently, generation relationship data (generation relationship information) between the boundary curved lines and the curved surfaces is produced. After the curved surfaces are produced, evaluation of the curved surface model as an automobile design is carried out with such functions as shading and reflection mapping.

By performing the designing operations from step 102 to step 106 on a system as described above, a primitive skeleton line model is formed which embodies basic dimensional requirements and a designing concept. Such a primitive skeleton line model is displayed on the display 30.

The operations from step 107 to step 108 are performed to modify details of the primitive skeleton lines of the kit model 21. At this stage, designing operation of the kit model 21 has progressed to some extent and details of the shape of the kit model 21 can be designed by for example newly adding curved lines which define characteristics of the shape (called characteristic line) to desired portions. The added or deleted data may be stored as a new kit model in the hard disk 20 which facilitates designing operation next time when a figuratively similar model is to be designed.

To modify details of the primitive skeleton lines, the designer views the kit model 21 which is displayed on the display 30 and inputs modification information 15a with the mouse 40. The modification information 15a is received by the modification information input routine 15 (step 102). Based on the modification information 15a which is received by the modification information input routine 15, the individual characteristic lines are added or deleted by the kit model modification routine 16 (step 107). Also, based on the modification information 15a which is received by the modification information input routine 15, the individual characteristic lines are changed by the kit model modification routine 16 (step 108). Then, the curved surfaces are produced and the shapes are evaluated to form details of the entire design of the model thus enhancing the quality of data (step 106).

The designing operations from step 107 to step 108 are performed on the system to produce a well-designed data model. The data model produced in such a way is displayed on the display 30.

Step 101 corresponds to the first step and step 102 corresponds to the second step. Similarly, steps 103, 105, and steps 107, 108 correspond to the third step.

3. Model Regeneration Function

The model regeneration function included in the kit model modification routine 16 is as follows. As described above, the operation for changing a shape or a figure is performed by executing the kit model modification routine 16. In the operation, as an object element is changed all elements which relate to the element are changed. The elements to be affected are extracted with reference to the data network 26 to be described with reference to FIG. 7. That is, all elements which are affected by the change of the object element can be obtained by tracing a Used list 24c based on the data network 26 when the element is changed. The kit model 21 can be regenerated by changing all the elements obtained. Thus, the function for regenerating the kit model 21 is called a model regeneration function.

The model regeneration function is a function which operates in such a way that as points, curved lines and curved surfaces of the kit model 21 are moved or changed, other graphic elements which relate to the changed graphic element are associatively modified. As required, the model can automatically be regenerated by having a generation relationship and a generation unit for each graphic element. Specifically, the model regeneration function is a technique which allows "linked modeling" or associative modeling. Specifically:

when a constituent point of a curved surface is moved, curved lines which are associated with it are changed.

when a curved line is changed, curved lines and curved surfaces which are associated with the changed curved line are changed.

When a designer moves a point, a curved line or a curved surface he or she wants to change, the associated portions move in linkage and the entire model shape is changed.

With the use of the model regeneration function, trial and evaluation of the designing operation such as 'how good is a sense of volume and balance as a whole?', 'how will the surface become when a certain line is changed?' is performed with a good responsiveness. The system may provide 'three-dimensional sketch' which replaces papers and painting materials.

The data structure for implementing the model regeneration function and model regeneration process using the data structure are described below.

3.1 Data Structure

Figure 5:
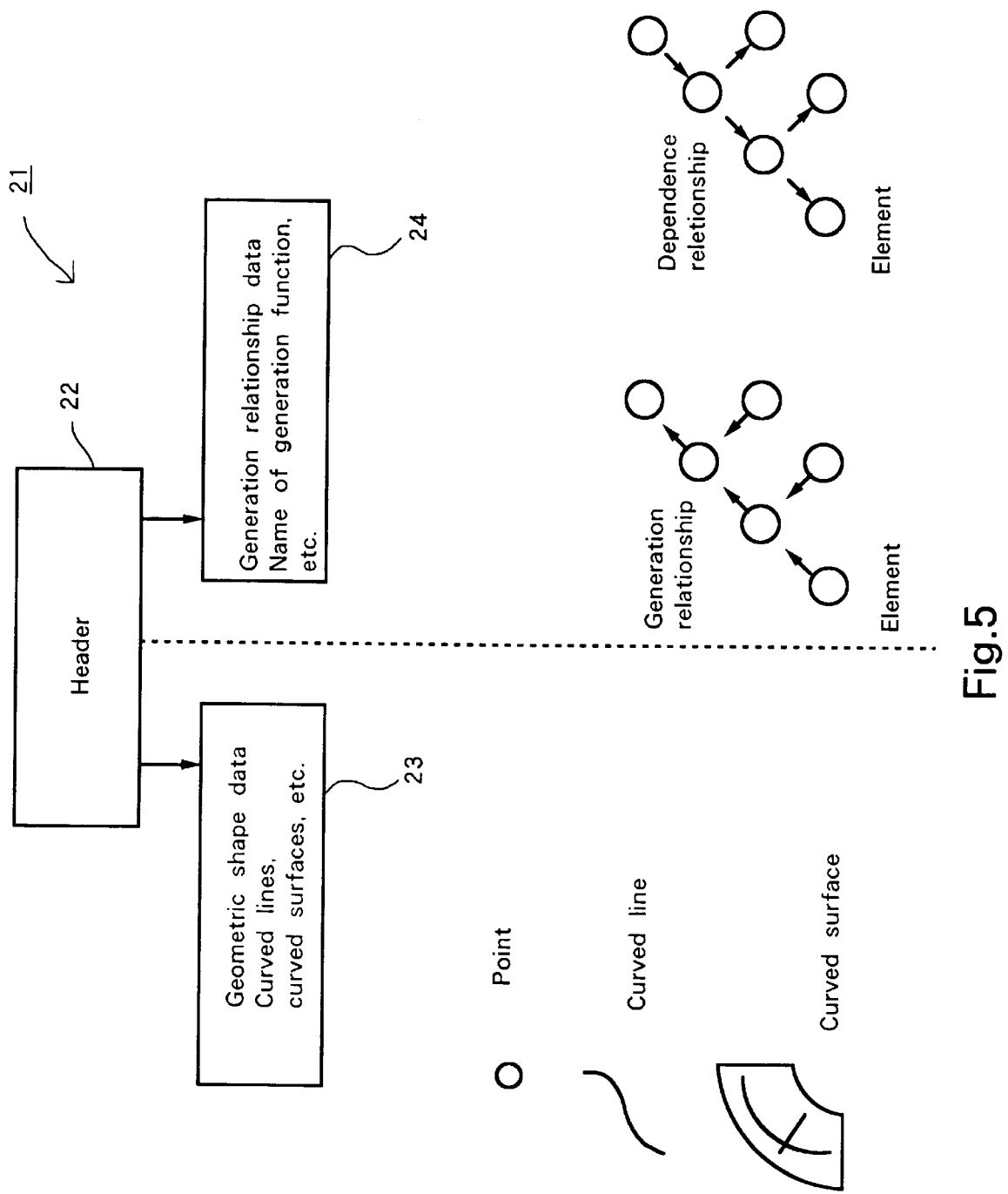
FIG. 5 is a block diagram showing data structure of elements of the kit model.
Figure 6:
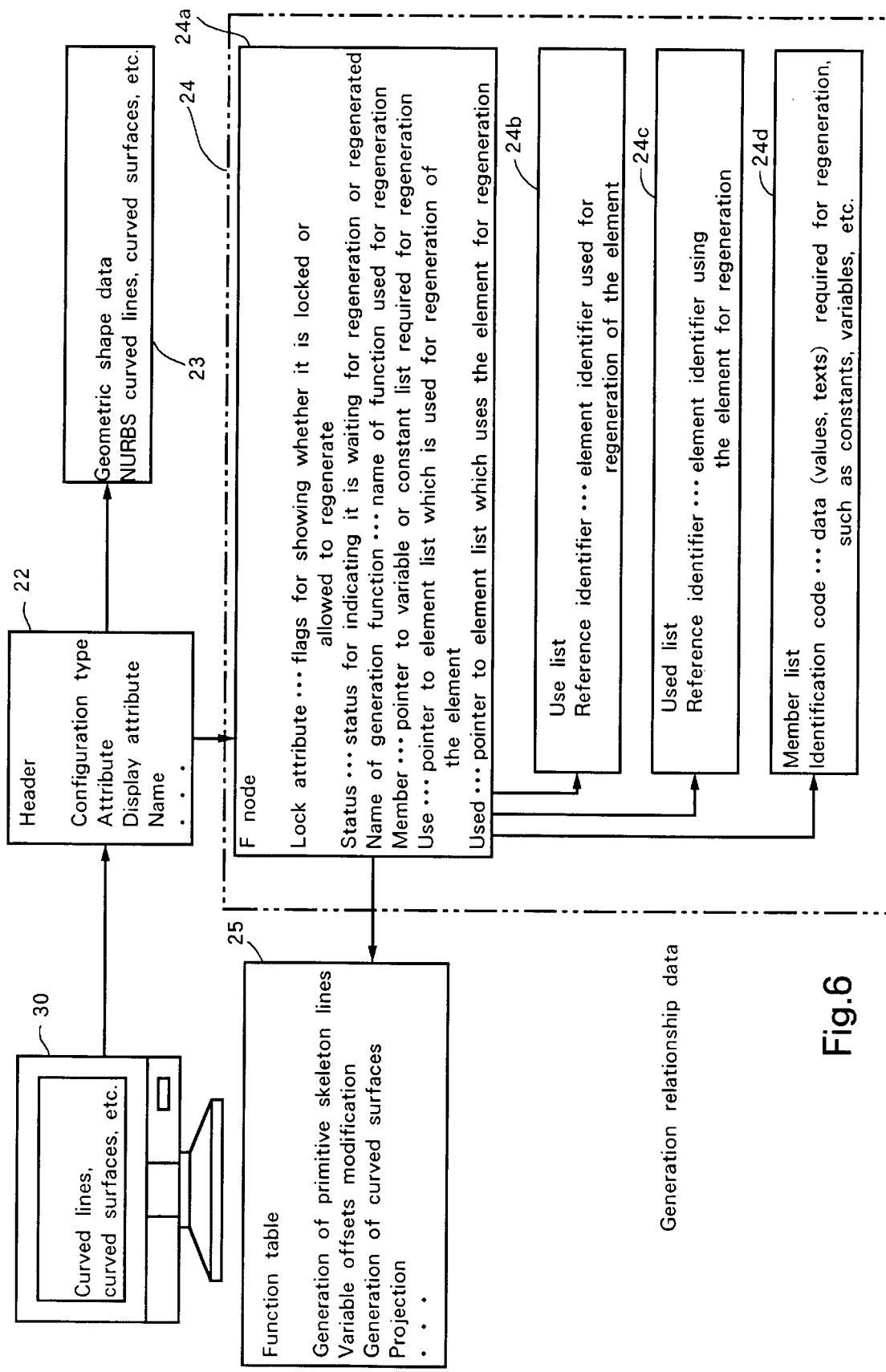
FIG. 6 is a block diagram showing data structure of elements of the kit model.

The data structure of each element is described with reference to FIG. 5 through FIG. 7. As shown in FIG. 5 and FIG. 6, the kit model 21 includes a header 22, geometric shape data 23, generation relationship data (correlation data) 24, and a function table 25. The geometric shape data 23 is data for specifying graphic elements. For example, coordinate values are used in case of a point, and NURBS (Non Rational Bspline) is used in case of a primitive skeleton line or a curved surface.

The generation relationship data 24 includes other elements (called ingredient elements) which are required for generating a graphic element, pointers for indicating parameters, and names of functions (called generation functions) which provide a generating method. That is, the generation relationship data 24 retains information as to with which and how the geometric shapes of the graphic elements are generated. Thus, the geometric shape of the graphic element can be re-calculated by using each information of the generation relationship data 24. Further, the function table 25 is a table showing relationship between the generation functions and their names. The function table 25 retains functions such as generation functions of primitive skeleton lines and variable offset changing functions.

As shown in FIG. 6, the generation relationship data 24 includes an F node 24a which is a center of the generation relationship and receives directions from the header 22, and a Use list 24b, a Used list 24c and a member list 24d. The F node 24a includes such things as a lock flag indicating whether or not it is locked, a status flag indicating whether or not regeneration is completed, a name of generation function, and a pointer to the Used list 24b. The Use list 24b includes element reference identifier (called R headers) indicating headers of ingredient elements which are required for regenerating the geometric shape data 23. The Used list 24c includes R headers which indicates elements which have headers 22 as their ingredient elements. The member list 24d includes parameters which are required for regenerating the elements which are referred to.

The F node 24a, the Use list 24b and other data which are included in the generation relationship data 24 constitute a data network 26 for regenerating geometric shape data 23. That is, as shown in FIG. 7, if the kit model 21 includes a plurality of elements such as element A, element B, element C, . . . etc., what are listed in the Use list 24b and the Used list 24c of the element A are R headers pointing to headers 22b–22e of the other elements B–E. The F node 24a of the element A includes as a generation function a name of the function which is in the function table 25. The member list 24d lists members which point to parameters in the parameter list 27. The same is true for data of the elements B through E.

Thus, the individual data is inter-related to build a data network 26 which represents a generation relationship. By referring to the data network 26, the geometric shape data 23 can be regenerated. That is, the geometric shape data 23 of the element B, the element C, . . . , and parameter I, parameter J, . . . , in the parameter list 27 are obtained from the data network 26, and an address of a generation function which corresponds to the name of the generation function in the F node 24a of the element A is obtained from the function table, so that the geometric shape data 23 of the element A is regenerated by executing the following formula.

Geometric shape data of element A=Generation function A (geometric shape data 23 of element B, geometric shape data of element C, . . . , parameter I, parameter J, . . . )

Figure 7:
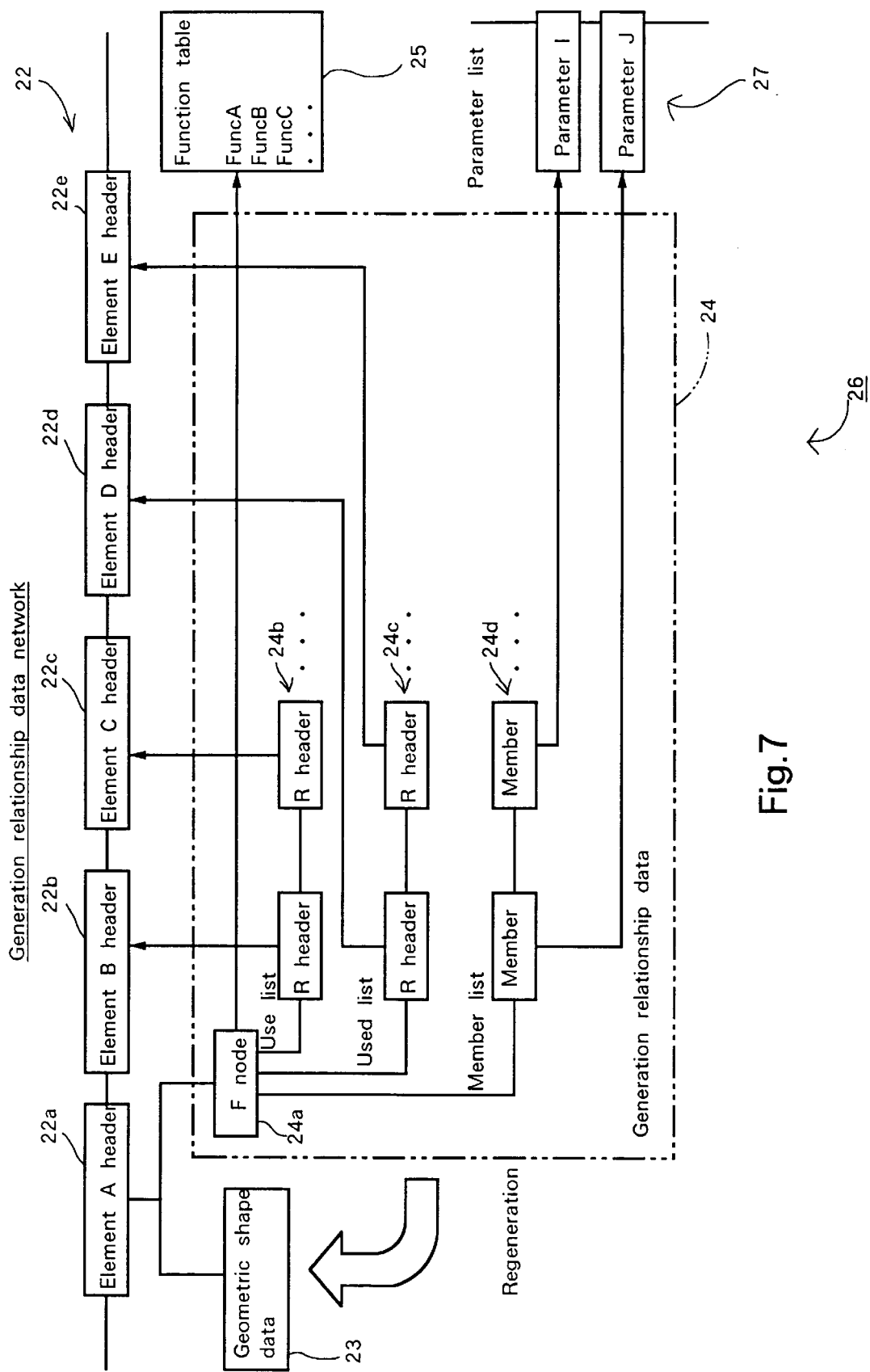
FIG. 7 is a block diagram showing a data network of elements of the kit model.

For the relationship of the elements in FIG. 7, the Use list 24b of element A points to the elements B and C, and the Used list of element A points to the elements D and E. Thus, the relationship of the generation sequence is such that elements B and C→element A→elements D and E. Therefore, if element B or C is changed, elements A, D and E are regenerated. Also, if element A is changed, elements D and E are regenerated. Regeneration is performed automatically. The mechanism is described hereafter. Further, since element A refers to parameters I and J, as the parameters I and J are changed, element A is regenerated.

3.2 Regeneration Mechanism

Figure 8:
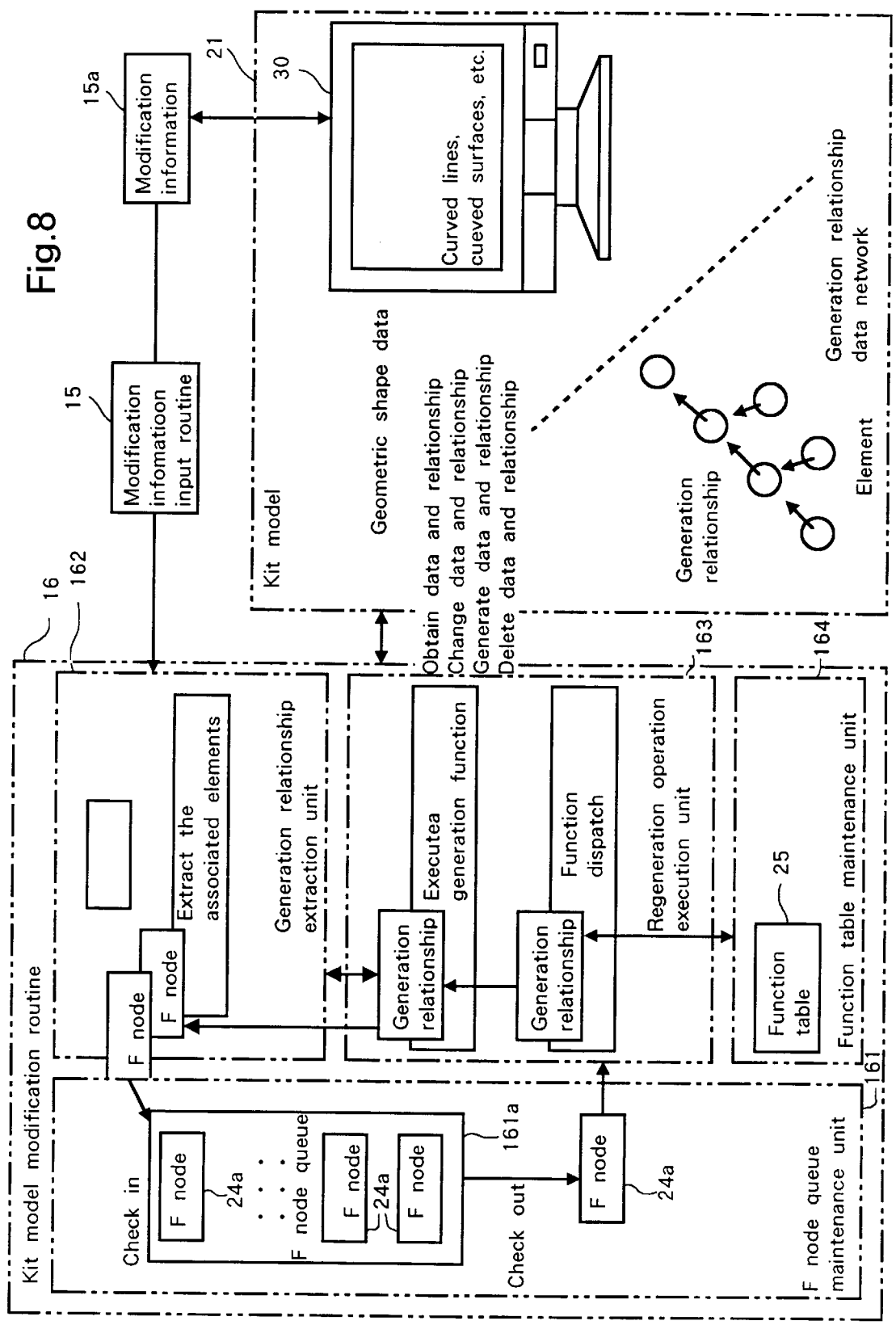
FIG. 8 is a block diagram showing a regeneration mechanism by a kit model modification routine.

Regeneration mechanism in the kit model modification routine 16 is now described. As shown in FIG. 8, the kit model modification routine 16 includes an F node queue managing unit 161 which manages a regeneration queue 161a (called F node queue), a generation relationship extraction unit 162 which extracts the graphic elements. The kit model modification routine 16 also includes regeneration operation execution unit 163 which executes the generation function specified by the F node, and a function table managing unit 164 which manages the function table 25.

The kit model modification routine 16 operates as follows. When modification information 15a of the kit model 21 is input by a user (designer), the modification information 15a is provided to the generation relationship extraction unit 162 in the kit model modification routine 16 through the modification information input routine 15. The modification information 15a provided by the operator may be information for moving a constituent point of a primitive skeleton line, or information for changing a primitive skeleton line, or other information. The generation relationship extraction unit 162 extracts the elements which are associated with the modification information 15a (for example element X) and checks an F node 24a of the element X in the F node queue 161a.

When the F node 24a is checked in the F node queue 161a, the F node queue managing unit 161 checks out the F node 24a with predetermined timing until the F node queue 161a is empty. The F node 24a being checked out is provided to a regeneration operation execution unit 163. The regeneration execution operation unit 163 obtains a generation function which corresponds to the name of generation function included in the F node from the function table 25.

The generation function is executed to regenerate its own geometric shape data 23 and a change message is sent to the generation function extraction unit 162. The generation function extraction unit 162 which has received the change message obtains elements (for example elements Y and Z), in which element X is included as an ingredient, from the Used list 24c of the element X. F node 24a of element Y and an F node 24a of the element Z are input to the F node queue 161a. Then, operations of the F node queue managing unit 161, the generation relationship extraction unit 162, and the regeneration execution operation unit 163 are sequentially repeated to regenerate all the elements (element Y, element Z, . . . ) which are affected when the element X is changed.

When the F node queue 161a becomes empty, it means that changing of the element by the user and subsequent regeneration of all the associated elements are completed. To the view of the user, elements which have generation relationship with a certain element is changed automatically as a shape or a parameter value of the certain element is changed and appropriate portions in the design of the entire model including lines, surfaces, parameters, etc. are changed. This allows the user to conduct designing while evaluating the result.

The generation function is executed as follows. For example, when a function of the element X is executed, a name of generation function is obtained from the F node 24a of the element X. Then, an address of the generation function which corresponds to the name of generation function is extracted from the function table 25. The generation function has the following form of call format.

Termination code=generation function (F node)

Thus, the generation function whose parameter is the F node 24a of the element X is executed to obtain necessary ingredient elements and parameters from the Use list 24b and the member list 24d retained by the F node 24a. Geometric shape data of the element X is regenerated based on these ingredient elements and parameters, and change message is sent to the generation relationship extraction unit 162.

The generation function is produced for each of elements (constituent point, a group of constituent points, curved line, a group of boundary lines, curved surface). Each generation function is described below.

A generation function of a constituent point (1) changes coordinate values of itself (constituent points) based on change amount data which is obtained from the member list, and sets a status flag of the F node of itself (constituent points) as "regenerated". Then, (2) it sends change message to the generation relationship extraction unit 162.

A generation function of a group of the constituent points, (1) if all the constituent points obtained from the Use list have not been changed, sequentially checks in at the F node queue 161a F nodes of the constituent points which have not been changed and sets a status flag of itself (the group of constituent points) as "waiting for regeneration". Movement amount and movement direction ($\Delta X$, $\Delta Y$, $\Delta Z$) which are determined by variable offset calculation are given to members of the F nodes to be checked in. Then, the generation function, (2) if the status flag of itself (the group of constituent points) indicates "waiting for regeneration" and the status flags of each constituent point all indicate "regenerated", sets the status flag of itself (the group of constituent points) as "regenerated" and sends change message to the generation relationship extraction unit 162.

A generation function of a curved line, (1) produces an interpolation curved line from the constituent points and tangent vectors obtained from the Use list and sets a status flag of itself (the curved line) as "regenerated". Then, (2) it sends a change message to the generation relation extraction portion 162.

Further, a generation function of a group of boundary lines, (1) if all curved lines obtained from the Use list have not yet been changed, checks in sequentially at the F node queue 161a the F nodes of the curved lines which have not been changed, and sets a status flag of itself (the group of boundary lines) as "waiting for regeneration". Then, (2) if the status flag of itself (the group of boundary lines) indicates "waiting for regeneration" and the status flags of each curved lines indicate "regenerated", it changes the status flag of itself (the group of boundary lines) to "regenerated" and sends a change message to the generation relationship extraction unit 162.

A generation function of a curved surface, (1) first produces a curved surface from a group of boundary lines obtained from the Use list and sets a status flag of itself (the curved surface) as "regenerated". Then (2) it sends a change message to the generation relationship extraction unit 162.

4. Example of Application

Figure 9:
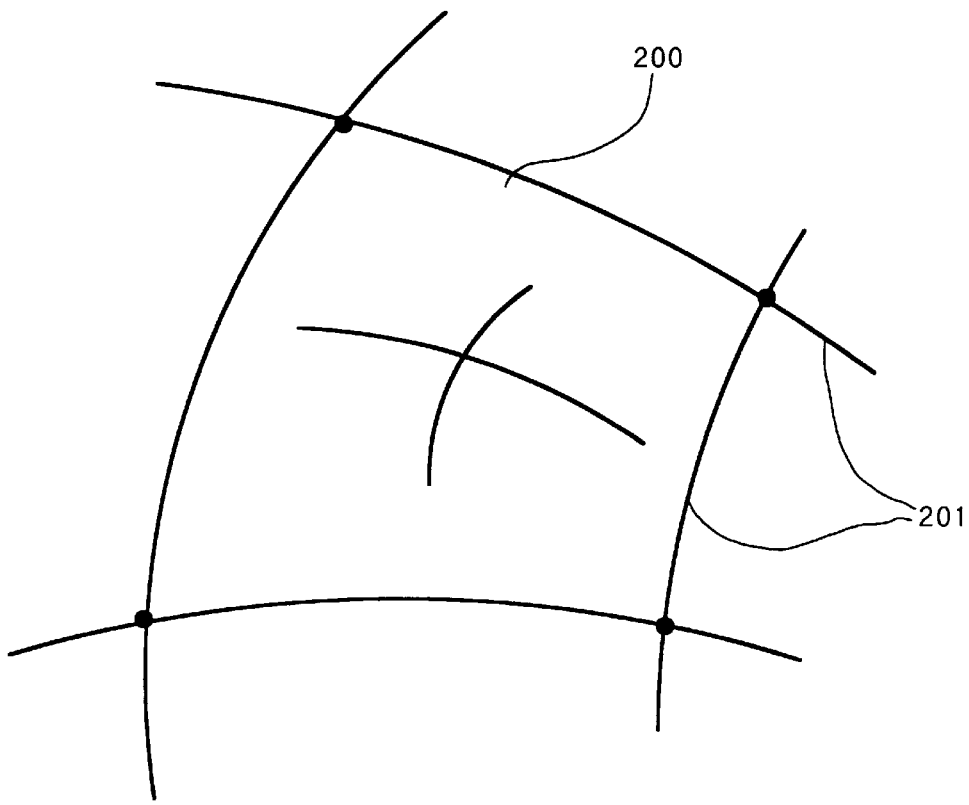
FIG. 9 is a block diagram showing relationship between a curved surface and its boundary lines.

The following description indicates how the above described model regeneration function operates referring to an example of application on actual line and surface data. FIG. 9 shows a curved surface 200 and its boundary curved lines 201. If the user changes the boundary curved line 201, the kit model routine 16 automatically regenerates the curved surface 200 maintaining the connection relationship of each boundary curved line 201.

Figure 10:
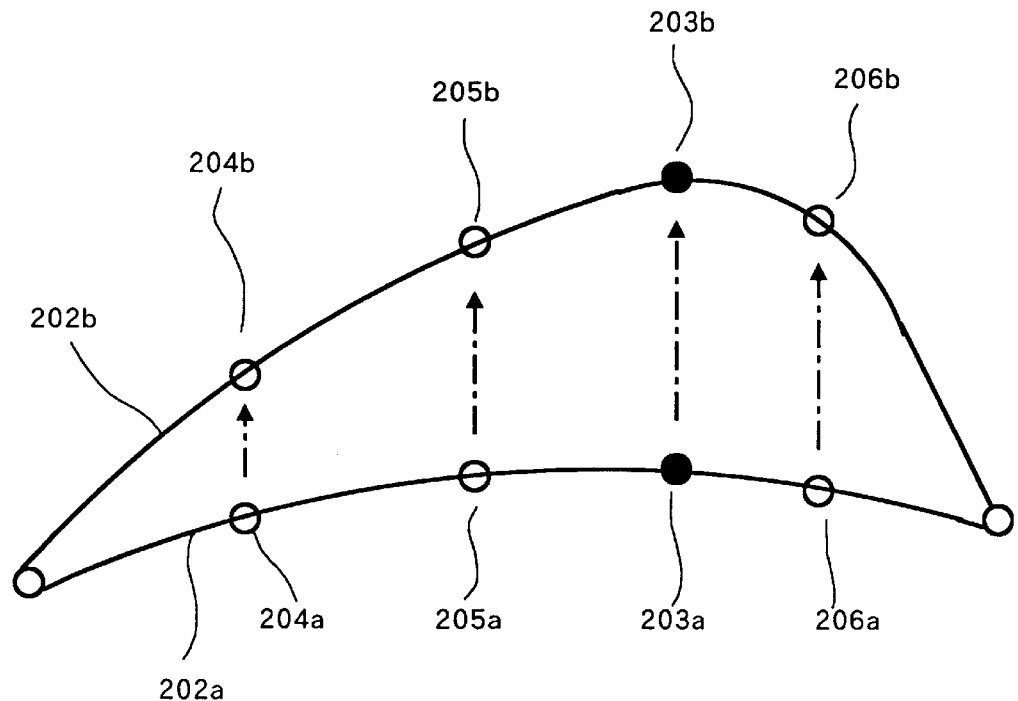
FIG. 10 is a block diagram showing a state when a curved line is changed with variable offsets.

As shown in FIG. 10, when a point 203a on a curved line 202a is moved to a location of a point 203b, other points 204a–206a on the curved lines 202a are moved to locations of points 204b–206b respectively and the whole curved line 202a is moved to a location of a curved line 202b. In the three-dimensional CAD system 1, when the user moves a certain point on a curved line, the entire curved line is changed as the point moves, and also curved surfaces using this curved line as a boundary is changed (changing of variable offsets).

How the curved surface is changed is described below based on data structure of a curved line and a curved surface and the regeneration mechanism using this data structure.

4.1 Data Structure of a Curved Surface

Figure 11:
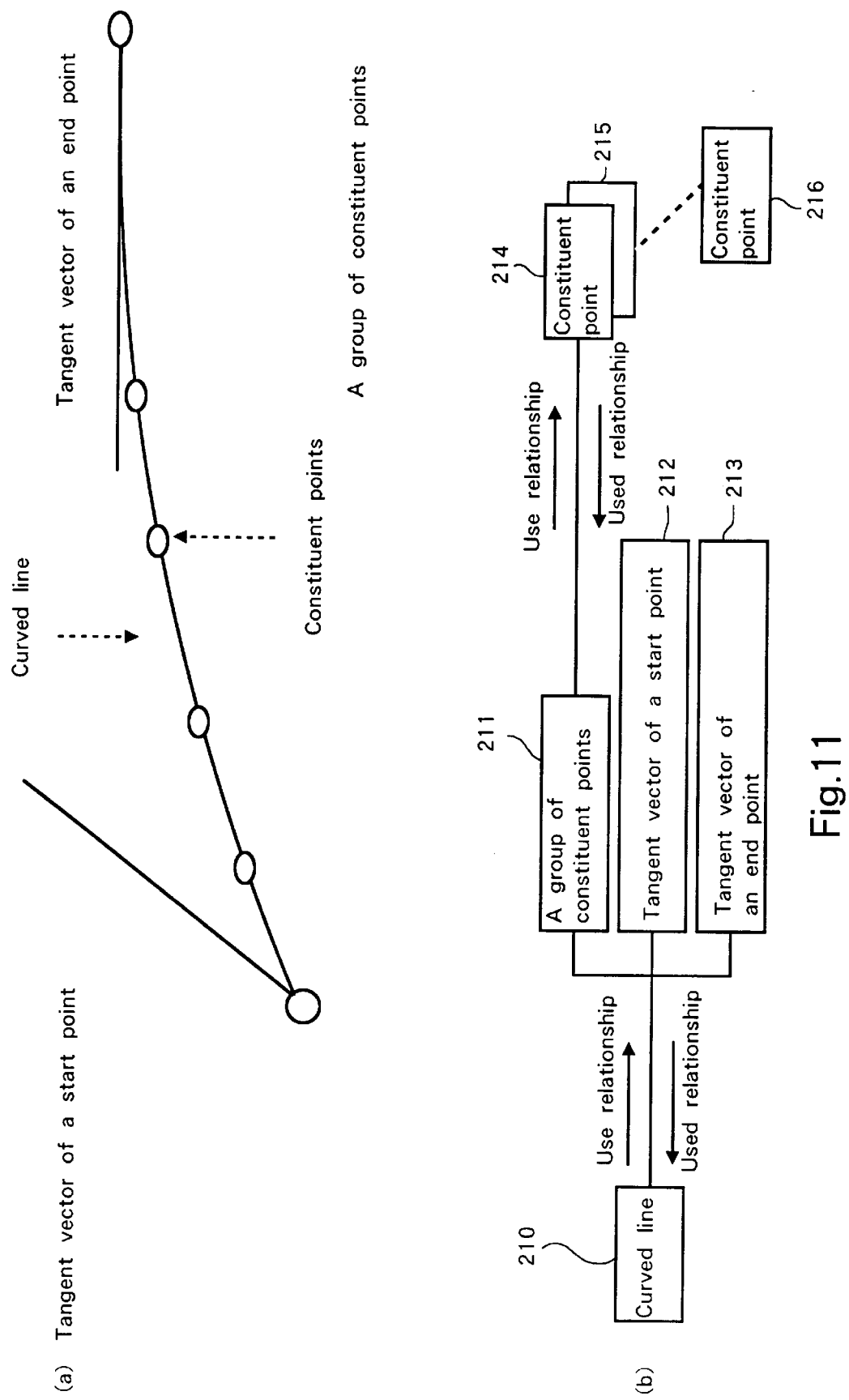
FIG. 11(a) is a block diagram showing relationship between a three-dimensional curved line and a group of points for interpolation.
FIG. 11(b) is a block diagram showing relationship among a primitive skeleton line, a group of constituent points and tangent vectors.

The data structure of a curved line is described below. As shown in FIG. 11(a), a three-dimensional curved line is generated from end definitions and a group of points for interpolation. The interpolation points are called constituent points of the curved line. For a primitive skeleton line 210 shown in FIG. 11(a), ingredient elements are a group of constituent points 211 and tangent vectors 212 and 213, and a generation function is "generation of a curved line by interpolating with a group of points". In the present embodiment, a general interpolation of a curved line is used. If a curved line is generated by projection onto a curved surface, ingredient elements are the curved lines and the curved surface used in the projection and the generation function is "projection to a curved surface".

Figure 12:
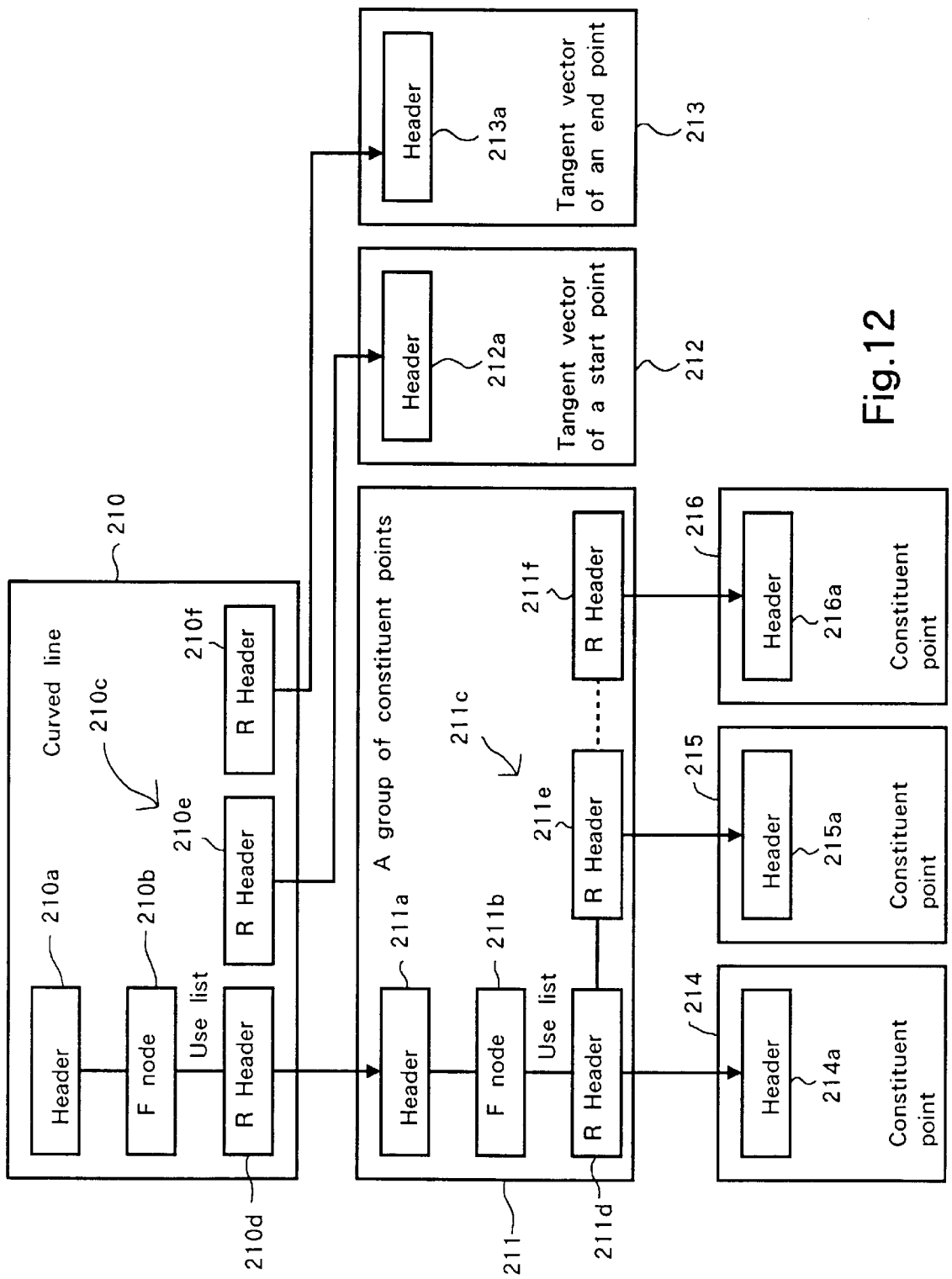
FIG. 12 is a diagram of data structure showing master (Use) relationship between a primitive skeleton line and a group of constituent points.

FIG. 12 shows a figure of generation relationship of (Use) data between the primitive skeleton line 210 and a group of constituent points 211. Listed in a Use list 210c of an F node 210b to which the header 210a of the primitive skeleton line 210 leads are an R header 210d which leads to a header 211a of a group of constituent points 211 of ingredient elements and R headers 210e and 210f which respectively leads to headers 212a and 213a of a tangent vector 212 of a start point and a tangent vector 213 of an end point, both being ingredient elements. R headers 211d–211f which lead to headers 214a–216a of each constituent point 214–216 of ingredient elements are listed in a Use list 211c of an F node 211b to which the header 211a of the group of constituent points 211 directs.

Further, set in the F node 210b of the primitive skeleton line 210 as the name of a generation function is "generation of a curved line by interpolation of a group of points". Further, set in the F node 211b of a group of constituent points 211 as a name of the generation function is "offset arrangement of a group of points". The generation functions can be obtained from a function table 25 shown in FIG. 13 based on the name of generation functions held by the F nodes 210b, 211b to execute the generation function.

In FIG. 12, a group of constituent points 211 uses constituent points 214–216 and is used by the primitive skeleton line 210. When the individual constituent points 214 through 216 are changed associatively, they are adjusted by the generation function of a group of constituent points 211. "Variable offsets modification" of the curved line by means of movement of constituent points as shown in FIG. 10 is a good example.

Figure 14:
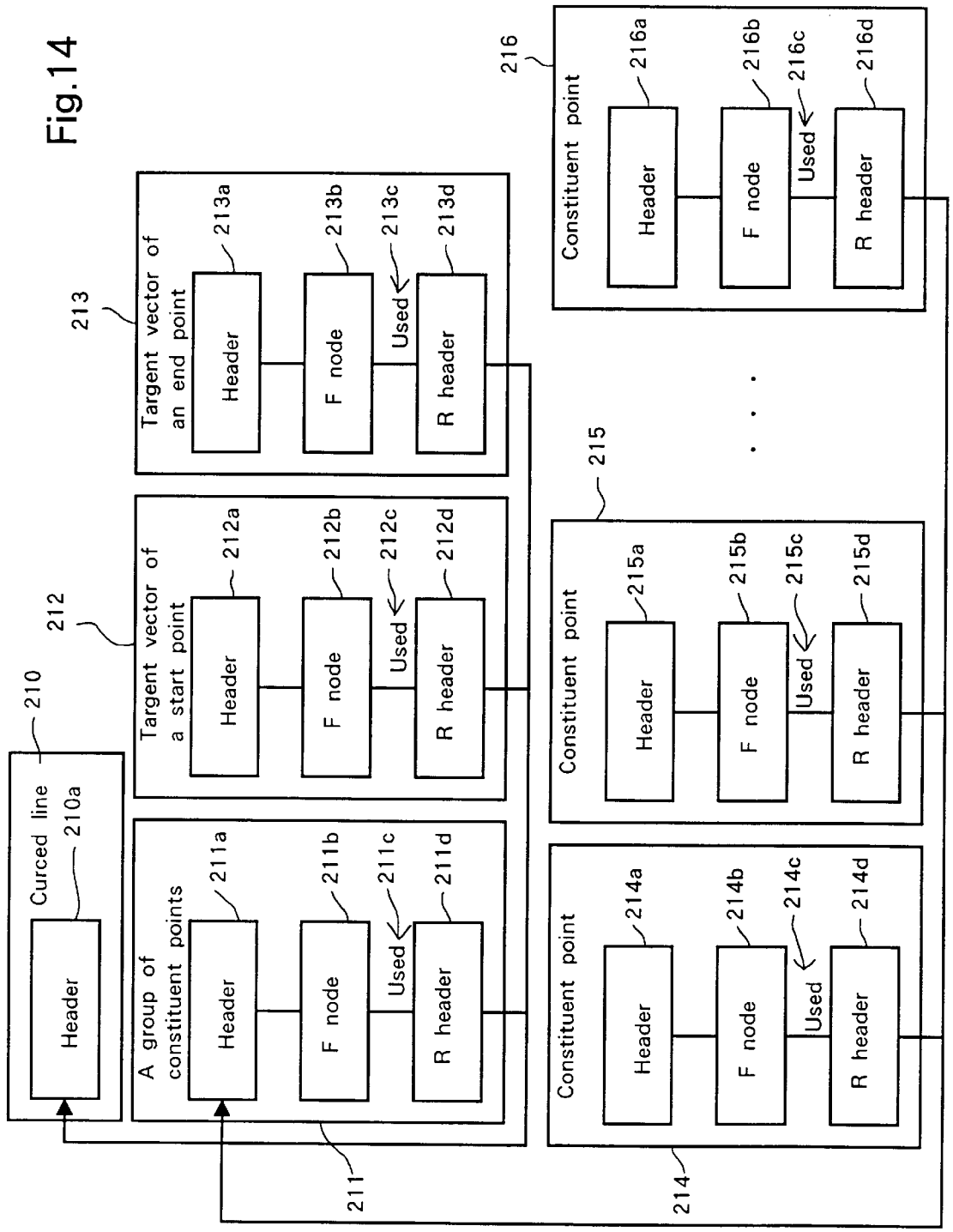
FIG. 14 is a diagram of data structure showing servant (Use) relationship between a primitive skeleton line and a group of constituent points.

While FIG. 12 illustrates a Use relationship, whenever the Use relationship exists, Used relationship also exists. FIG. 14 shows Used relationship which corresponds to FIG. 12. As shown in FIG. 14, listed in the Used lists 214c–216c of the F nodes 214b–216b to which headers 214a–216a of the constituent points 214–216 lead are R headers 214d–216d which lead to the header 211a of a group of constituent points 211 which in turn include headers 214a through 216a as ingredient elements.

Listed in the Used list 211c of the F node 211b which is led by the header 211a of a group of constituent points 211 and in the Used lists 212c and 213c of the F nodes 212b and 213b which are led by the headers 212a and 213a of the tangent vectors 212 and 213 are R headers 211d through 213d which lead to the header 210a of the primitive skeleton line 210 which include the headers 211a–213a as ingredient elements. The Used relationship as described above is used for obtaining elements to be changed in linkage.

4.2 Data Structure of a Curved Surface

Figure 15:
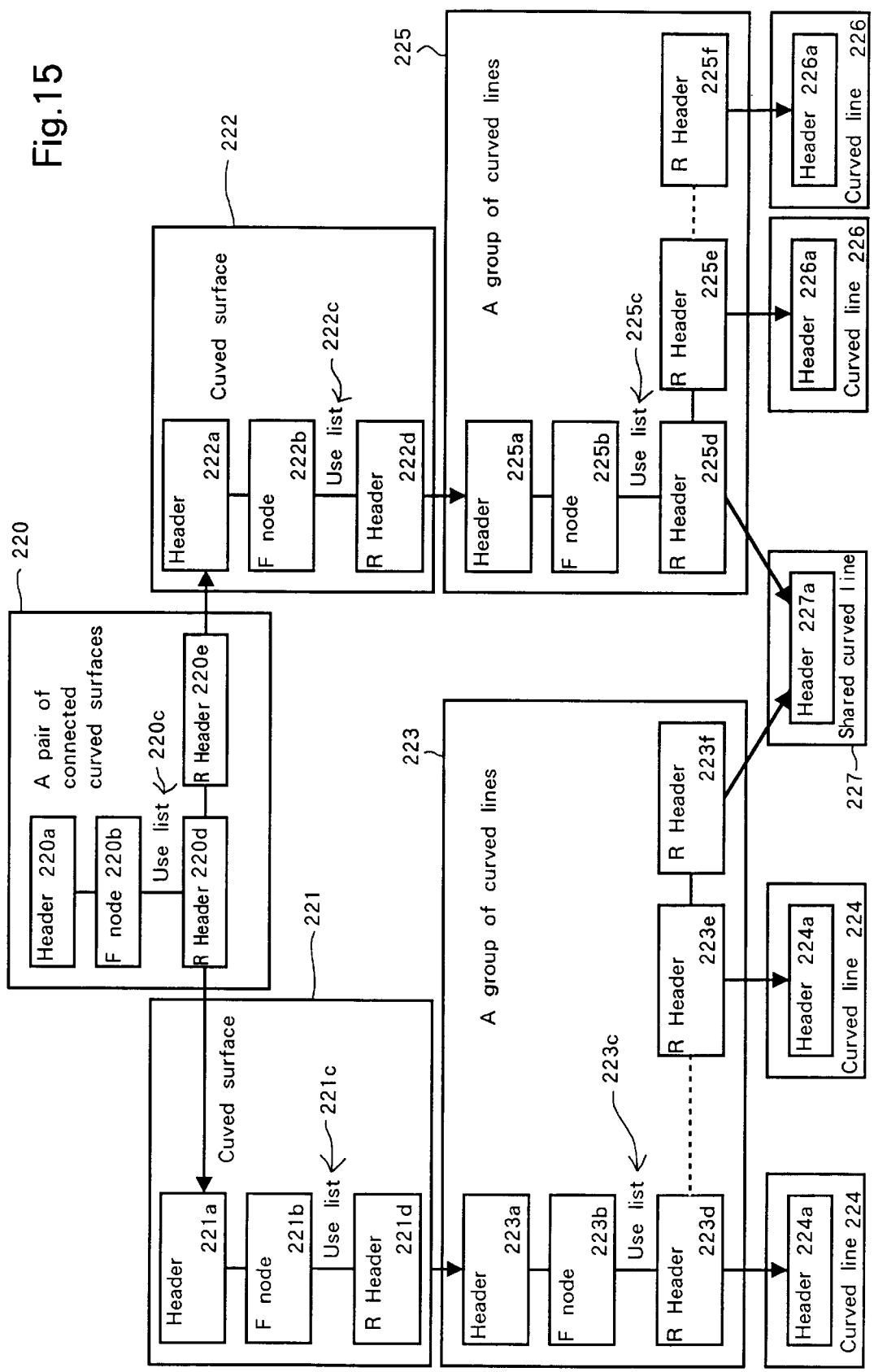
FIG. 15 is a diagram showing master (Use) relationship between a curved surface and a group of curved lines.

A Data structure of a curved surface is described below. As shown in FIG. 15, listed in a Use list 220c of a F node 220b which is led by a header 211a of a pair of connected curved surfaces 220 are an R header 220d and an R header 220e. The R header 220d leads to a header 221a of a curved surface 221 which is one of the curved surfaces of the connected surface pair 220 while the R header 220e leads to a header 222a of a curved surface 222 which is the other curved surface of the connected curved surface pair 220. Further, listed in a Use list 221c of an F node 221b which is led by a header 221a of the curved surface 221 is an R header 221d which leads to a header 223a of a group of curved lines 223 which is a set of boundary curved lines forming the curved surface 221 or a set of curved lines which refer to the curved surface 221. Listed in a Use list 223c of the F node 223b which is led by a header 223a of the group of the curved lines 223 are R headers 223d–223e which lead to headers 224a of curved lines 224 of ingredient elements and an R header 223f which leads to the header 227a of a shared curved line 227 which is shared by the curved surfaces 221 and 222.

R header 222d is listed in Use list 222c of the F node 222b which is led by the header 222a of the curved surface 222. The R header 222d leads to a header 225a of a group of curved lines 225 which is a group of boundary curved lines or a group of curved lines forming the curved surface 222. An R header 225d and R headers 225e–225f are listed in the Use list 225c of the F node 225b which is led by the header 225a of a group of the curved surfaces 225. The R header 225d leads to a header 227a of the shared curved line 227 and the R headers 225e–225f leads to headers 226a of curved lines 226 which are ingredient elements.

In the F nodes 221b and 222b of the curved surfaces 221 and 222, "generation of a curved surface using four boundaries" is set as a name of generation function. In the F nodes 223b and 225b of the groups of points 223 and 225, "arrangement of boundary curved lines" is set as a name of generation function.

4.3 Regeneration Mechanism of a Curved Surface

Figure 16:
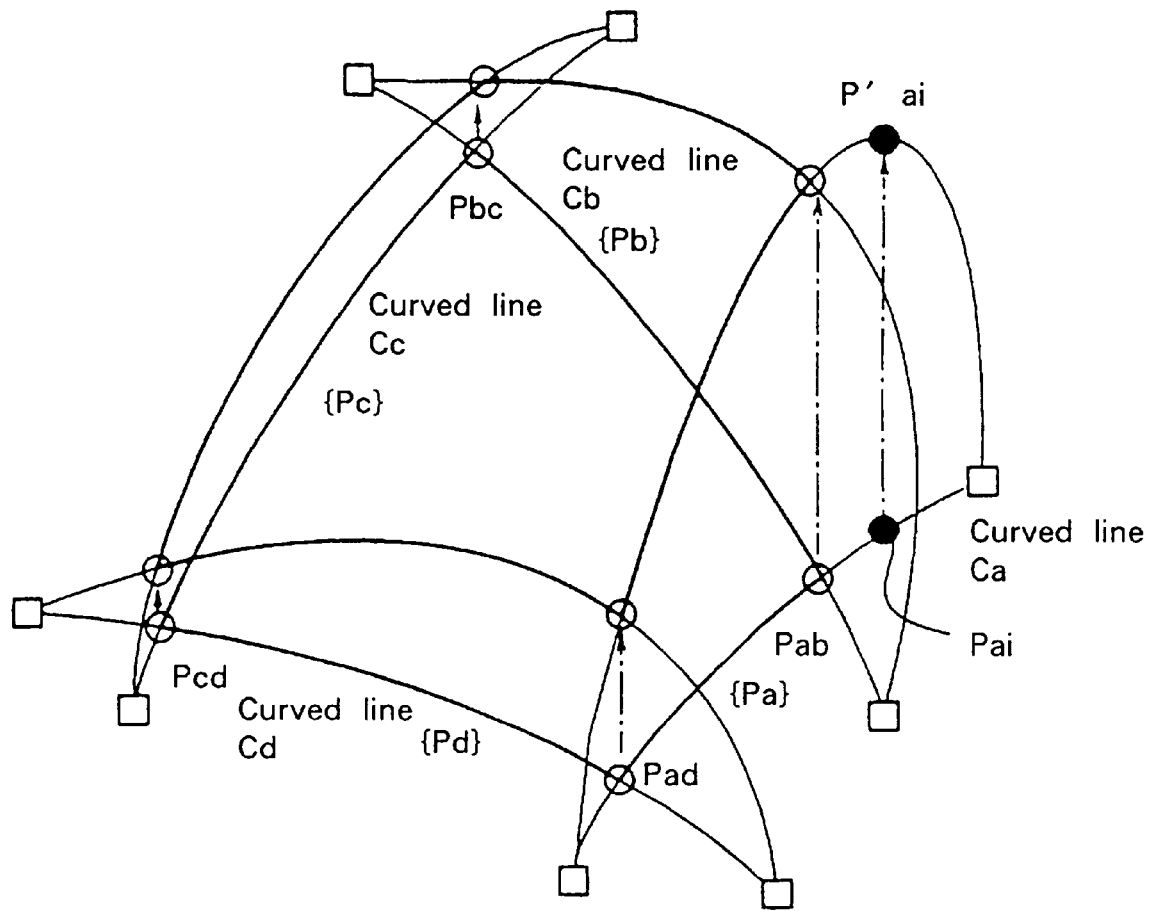
FIG. 16 is a diagram showing offset movement for a group of constituent points.

Regeneration mechanism of the curved surface is described below. FIG. 16 is a diagram showing an example of an offset movement of a group of constituent points. A group of constituent points of a curved line Ca is PGa which includes constituent points {Pa1, . . . , Pab, . . . , Pad, . . . , Pak}. The constituent point Pab is an intersection point of the curved lines Ca and Cb. A constituent point Pad is an intersection point of the curved lines Ca and Cd. Constituent points of a group of constituent points PGb are {Pb1, . . . , Pab, . . . , Pbc, . . . , Pbl} while constituent points of a group of constituent points PGc are {Pc1, . . . , Pbc, . . . , Pcd, ..., Pcm} and constituent points of a group of constituent points PGd are {Pd1, . . . , Pad, . . . , Pcd, . . . , Pcn}. The constituent point Pbc is an intersection point of the curved lines Cb and Cc, and the constituent point Pcd is an intersection of the curved lines Cc and Cd.

As shown in FIG. 16, when a constituent point Pai on a curved line Ca is moved, the curved surface enclosed by curved lines Ca, Cb, Cc, Cd is regenerated as the constituent point Pa is moved. The process and mechanism of the fenerating operation is described below with reference to FIG. 17 and FIG. 18.

When a user moves the constituent point Pai, a modification information input routine 15 is executed and coordinate values (X, Y, Z) which are amounts of movement of the constituent point Pai are provided to a generation relationship extraction unit 162. The generation relationship extraction unit 162 sets the coordinate values (X, Y, Z) to the parameters which are pointed to by members in a member list which is indicated by the F node 230 of the constituent point Pai, and a name of generation function held by an F node 230 of the constituent point Pai is set to be "changing of coordinate values". The F node 230 of the constituent point Pai is checked in at an F node queue 161a (see Status A).

Then, the F node 230 of the constituent point Pai is checked out by an F node queue managing unit 161 and is provided to a regeneration operation execution unit 163. The regeneration operation execution unit 163 obtains from a function table 25 a generation function which corresponds to the name of generation function (the name of generation function is "offset movement for a group of constituent points") held by the F node 230 of the constituent point Pai and executes this generation function. As a result of execution of the generation function, the coordinate values of the constituent point Pai are changed and the status flag held by the F node 230 of the constituent point Pai is set as "regeneration completed". Then, a message that its coordinates were changed is sent to a generation function extraction unit 162.

The status flag is a flag representing a dynamic status of regeneration for each element and is managed by the generation function. The status represented by the flag includes "waiting for regeneration", "regeneration completed", and "empty".

The generation function extraction unit 162 which received the message from the regeneration operation execution unit 163 extracts an F node 231 of a group of the constituent points PGa from a Used list held by the F node 230 of the constituent point Pai and checks it in at the F node queue 161a (see Status B). The F node 231 of the group of constituent points PGa is checked out by the F node queue managing unit 161 and is provided to the regeneration operation execution unit 163. The regeneration operation execution portion 163 executes a generation function held by the F node 231 of the group of constituent points PGa.

By execution of the generation function, status flags held by F nodes 232–235 of the constituent points Pa1–Pak are examined for each constituent point Pa1–Pak which is pointed to by R headers listed in the Use list of the F node 231 of the group of constituent points PGa. In this step, the status flags of the constituent points Pa1–Pak represent "Empty", so that movement amounts and movement directions (ΔX, ΔY, ΔZ) determined by variable offset calculation are set in a member list which is held by F nodes 232–235 of the constituent points Pa1–Pak. Then, the F nodes 232–235 of the constituent points Pa1–Pak which are set with the movement amounts are sequentially checked in at the F node queue 161a (see Status C), and the status flag held by the F node 231 of the group of constituent points PGa is set with "waiting for regeneration".

The F nodes 232–235 which were checked in at the F node queue 161a are provided to the regeneration operation execution unit 163 to execute generation function of the constituent points Pa1–Pak. By the execution, the coordinate values of the constituent points Pa1–Pak are changed and the status flags held by the F nodes 232–235 of the constituent points Pa1–Pak are set with "regeneration completed". The message that its coordinates were changed is sent to the generation function extraction unit 163.

The generation function extraction unit 162 which received the message from the regeneration operation execution unit 163 extracts the F node 231 of the group of constituent points PGa from the Used list held by the F node 232 of the constituent point Pa1 and checks it in at F node queue 161a. As described above, since the constituent point Pab is an intersection point of the curved lines Ca Cb, an R header which is listed in the Used list of the F node 233 of the constituent point Pab also points to the group of the constituent points PGb. The F node 236 of the group of constituent points PGb is extracted from the Used list of the constituent point Pab and is checked in at the F nod queue 161a. Further, the constituent point Pad is an intersection point of the curved lines Ca and Cd, so that an F node 237 of the group of constituent points PGd is extracted from the Used list of the constituent point Pad and is checked in at the F node queue 161a. As a result of the above described check-in operations, the F node 231 of the group of constituent points PGa, the F node 236 of the group of constituent points PGd, and the F node 237 of the group of constituent points PGd are stored in the F node queue 161a (see Status D).

The F node 231 of the group of constituent points PGa is checked out by the F node queue managing portion 161 and is provided to the regeneration operation execution portion 163. The regeneration operation execution portion 163 executes the generation function held by the F node 231 of the group of constituent points PGa. In this step, all status flags of constituent point Pa1, Pa2, . . . , Pak represent "regeneration completed" and the status flag of the group of constituent points PGa indicates "waiting for regeneration", so that the status flag of the group of constituent points PGa is changed to "regeneration completed". The F node 238 of the curved line Ca is extracted from the Used list which is held by F node 231 of the group of constituent points PGa and is checked in at the F node queue 161a (see Status E).

The F nodes 236 and 237 of the group of constituent points PGb and PGd are checked out and are provided to regeneration operation execution unit 163 by the F node queue managing unit 161. The regeneration operation execution portion 163 executes generation functions which are held by the F nodes 236 and 237 of the groups of constituent points PGb and PGd. In execution of the generation functions, the status flags of the constituent points Pb1–Pbn, and Pd1–Pdn are examined for each of the constituent points Pb1–Pbn, and Pd1–Pdn which are pointed to by the R headers listed in the Use list of the F nodes 236, 237 of the groups of the constituent points PGb, PGd.

In this step, the status flags of the constituent points Pb1–Pbn, and Pd1–Pdn do not indicate "regeneration completed", so that movements amounts and movement directions (ΔX, ΔY, ΔZ) which are determined by calculating variable offsets are set to the member lists of the F nodes 239–246 of the constituent points Pb1–Pbn, Pd1–Pdn. Then, the F nodes 239–246 where the movement amounts and others are set are sequentially checked in at the F node queue 161a (see Status E), and the status flags held by F nodes 236, 237 of the group of constituent points PGb, PGd are set with "waiting for regeneration".

Then, similar operations continue to change each element in the order of points→a group of points→curved lines→a group of boundaries→curved surface, and the curved surface is generated. Any further operations are not performed since in the present embodiment there are no elements which include a curved surface as ingredients.

Figure 17:
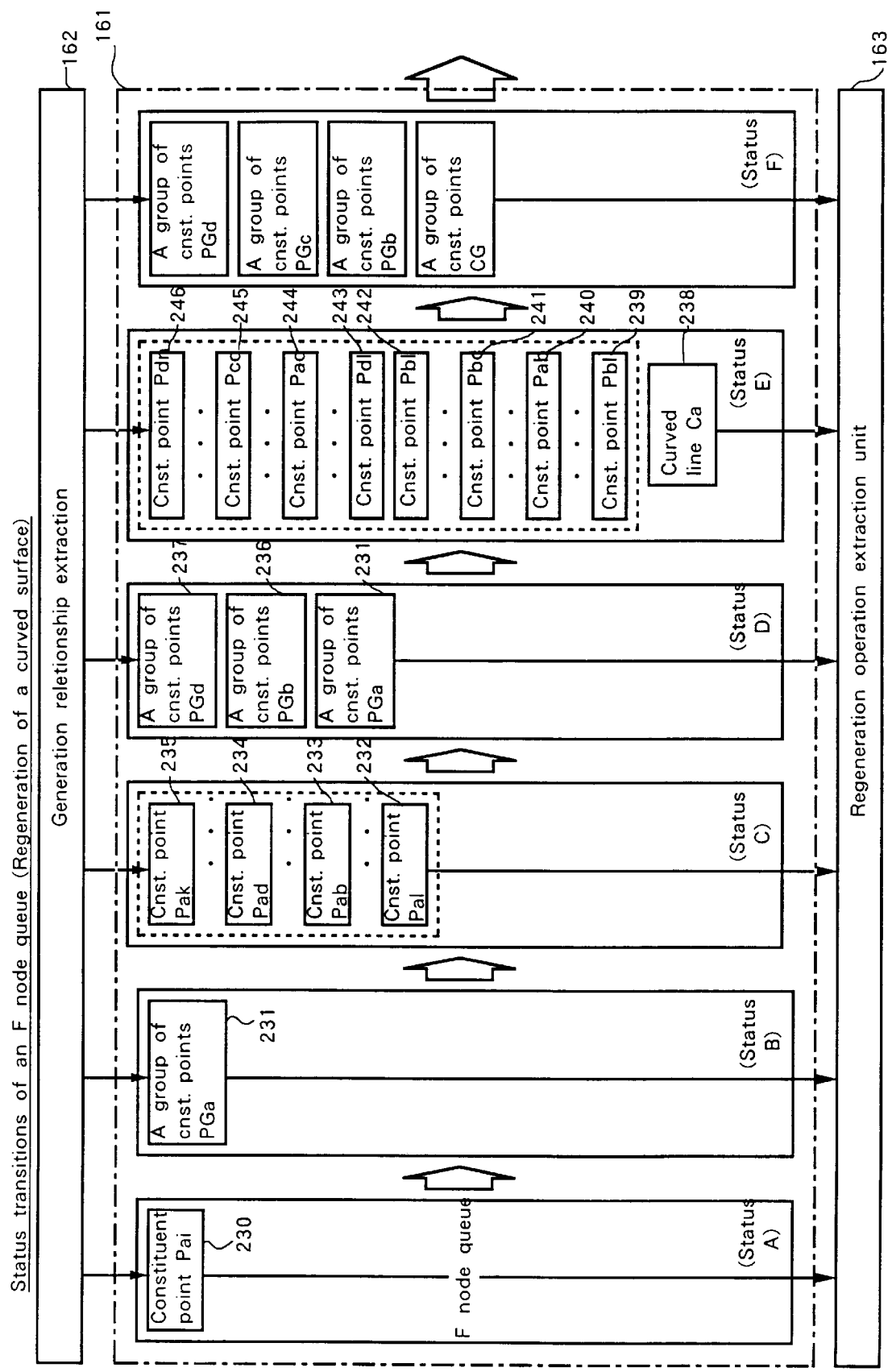
FIG. 17 and FIG. 18 is a diagram showing status transitions of an F node queue in regeneration of a curved surface.
Figure 18:
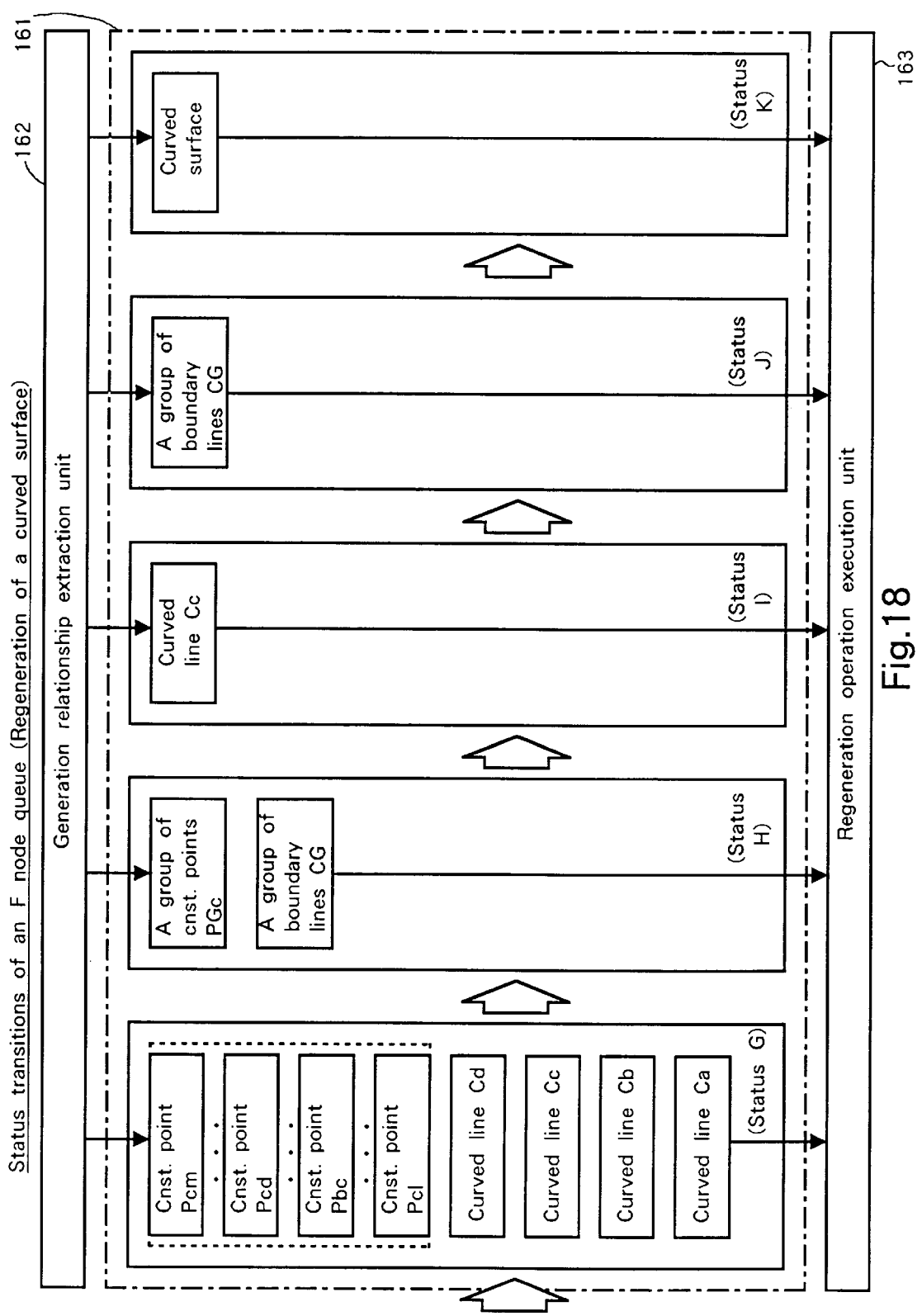
Figure 19:
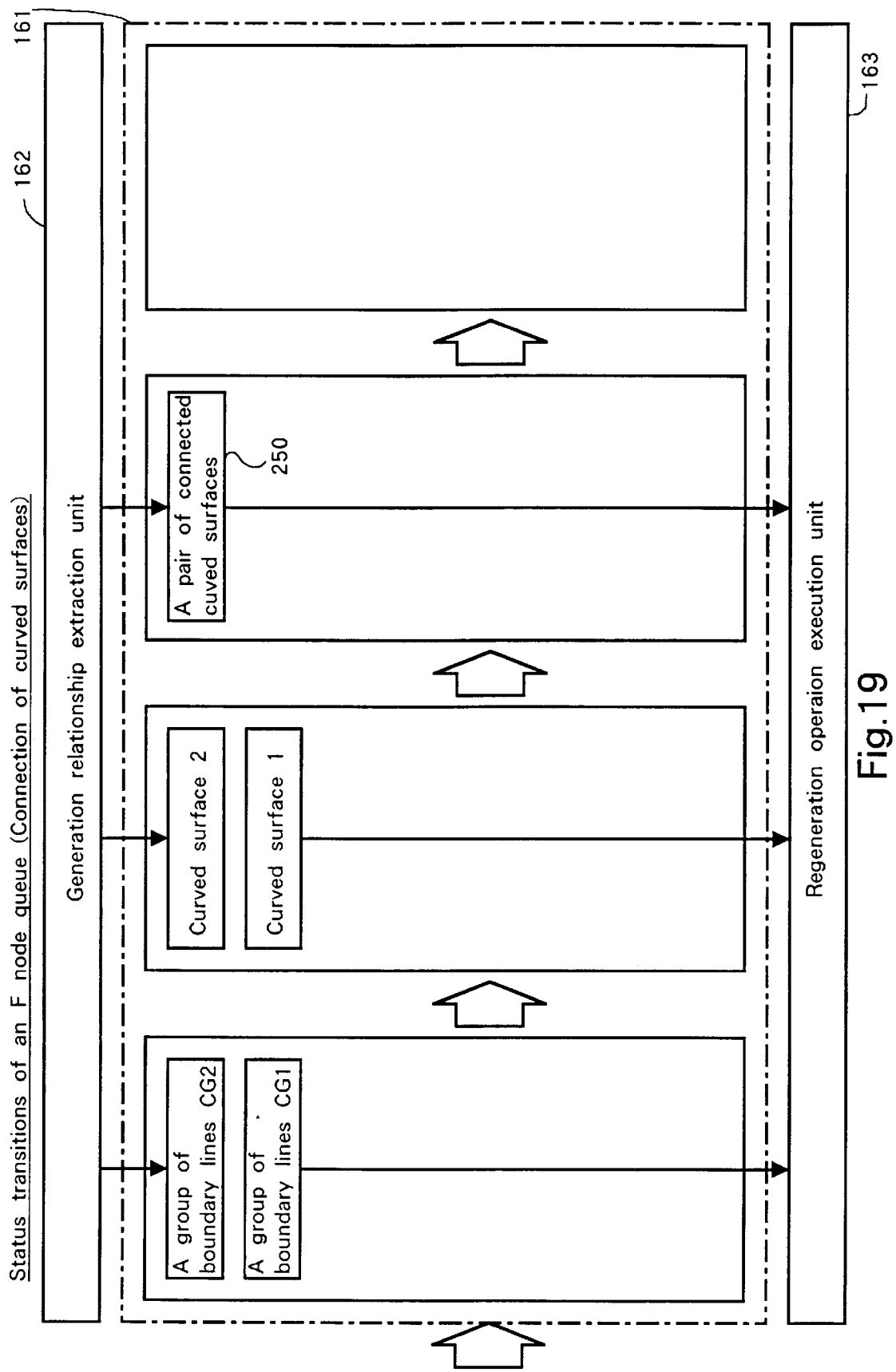
FIG. 19 is a diagram showing status transitions of an F node queue in connection of curved surfaces.

If a pair of curved surfaces is adjoining and both curved surfaces have connection relationship with each other, restrictions on connection need to be satisfied when a curved surface is changed. In this case, similar operations as those shown in FIG. 17 and FIG. 18 are performed to regenerate two curved surfaces while managing the relation of connection of the two surfaces. This example is shown in FIG. 19. As shown in FIG. 19, an F node 250 of a pair of connected curved surfaces is checked in at the F node queue managing unit 161 and the generation function of a pair of connecting surfaces is executed. The connection of the curved surfaces is adjusted and smooth connection of the curved surfaces is realized by the execution.

5. Storage Media for Three-Dimensional Modeling

Figure 20:
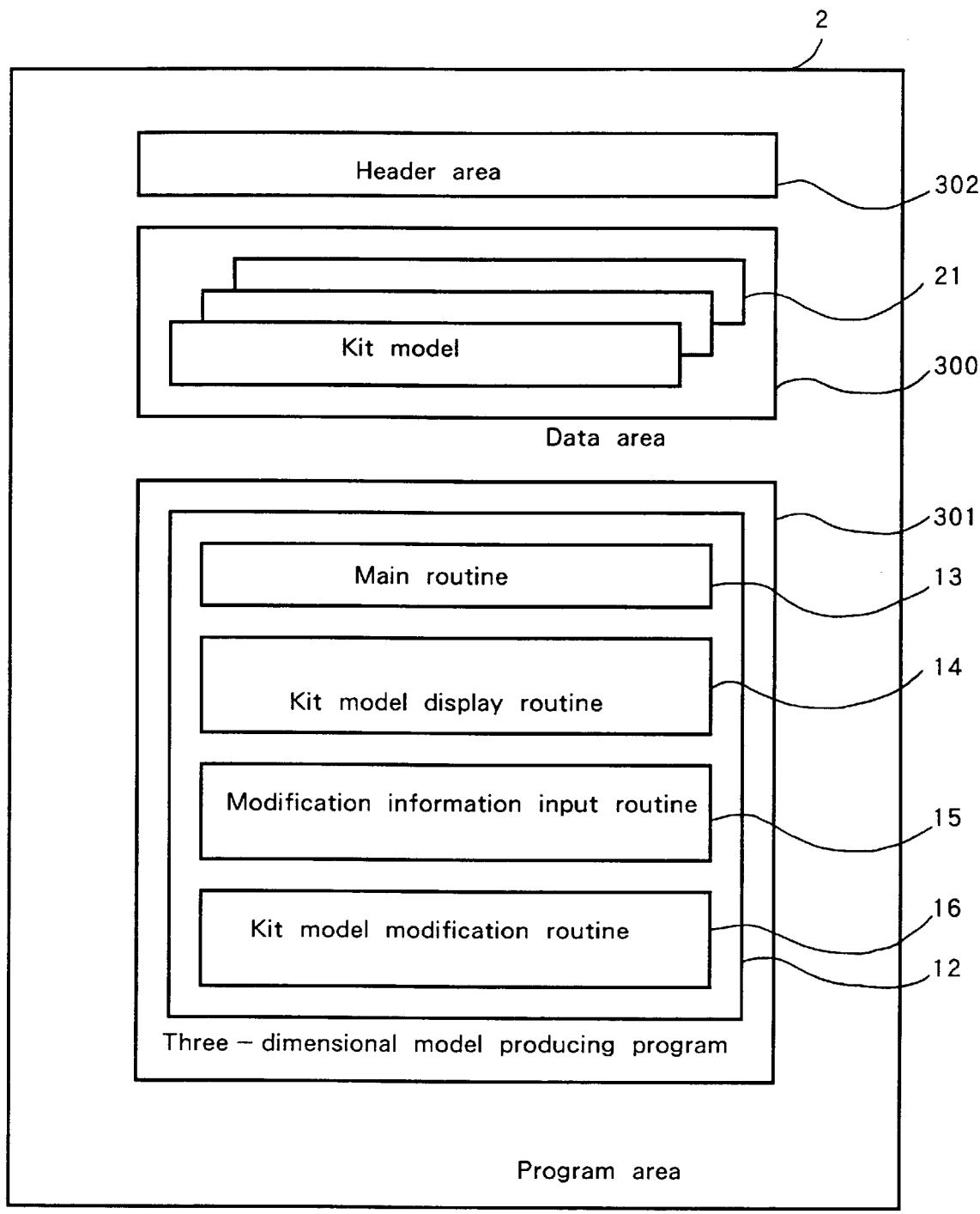
FIG. 20 is a block diagram showing an embodiment of a storage media for producing a three-dimensional model according to the invention.

The storage media for three-dimensional modeling is described below. FIG. 20 is a block diagram showing a data structure of a storage media 2 for three-dimensional modeling. The storage media 2 for three-dimensional modeling includes a data area 300 for storing kit models 21 which are represented by a plurality of primitive skeleton lines of geometric structure of object articles to be designed, a program area 301 for storing three-dimensional modeling program 12, and a header area 302 for storing block number data, area managing data and some other data.

The three-dimensional model producing program 12 includes a main routine 13 for controlling operations, a kit model display routine (display routine) 14 for displaying the lit model 21 on a display, a modification information input routine (input routine) 15 for receiving modification information 15a which is input based on the kit model 21 displayed on the display, a kit model modification routine (modification routine) 16 for modifying the kit model 21 based on the modification information 15a. The storage media 2 for three-dimensional modeling may be any information media which can store information optically or magnetically, such as a flexible disk, CD-ROM, MD, etc.

The three-dimensional model producing program 12 which is stored in the storage media 2 for three-dimensional modeling can be executed in a predetermined information processing unit. An example of the information processing unit is shown in FIG. 21.

Figure 21:
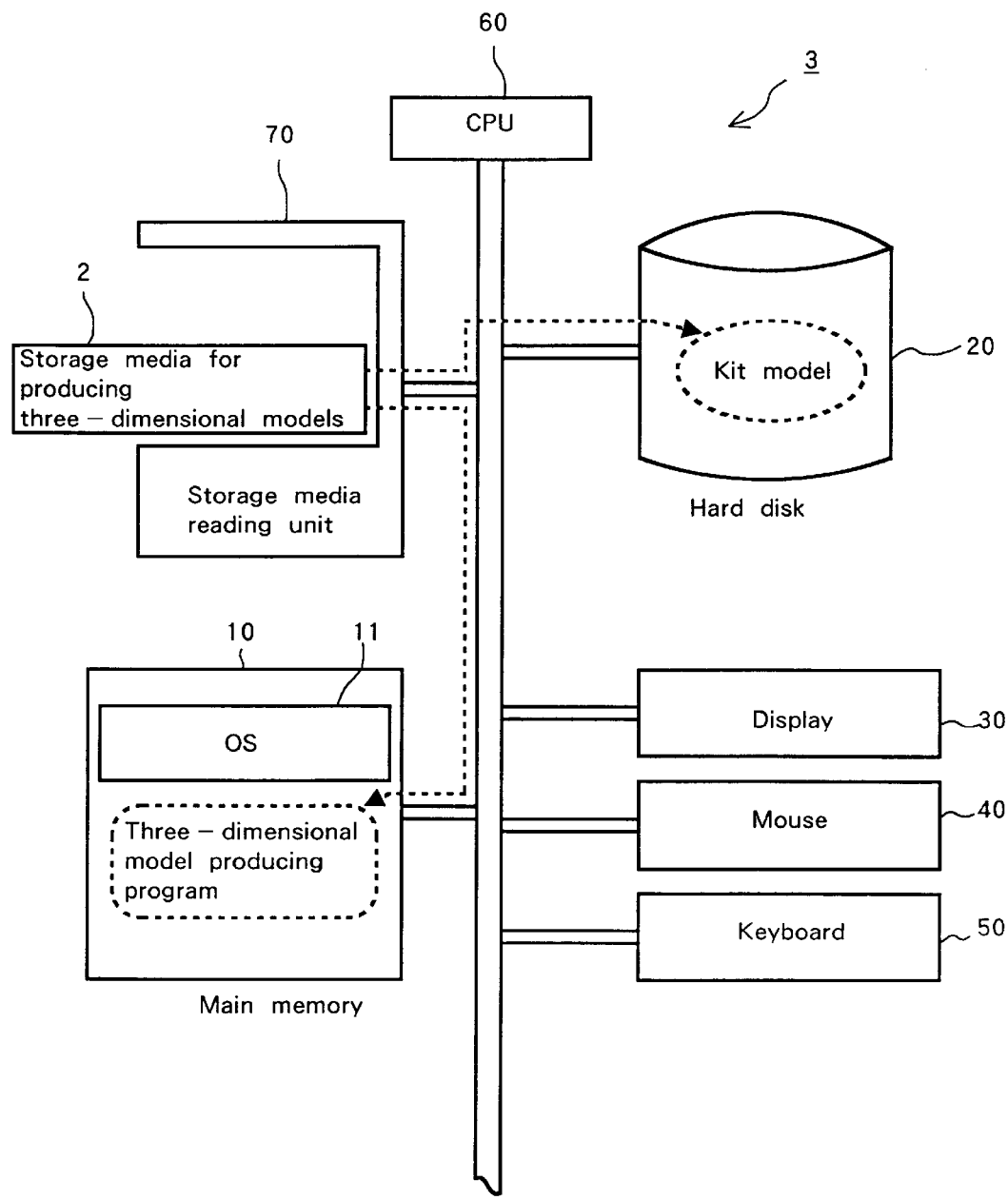
FIG. 21 is a block diagram showing constitution of an information processing unit which includes a storage media for producing a three-dimensional model.
Figure 22:
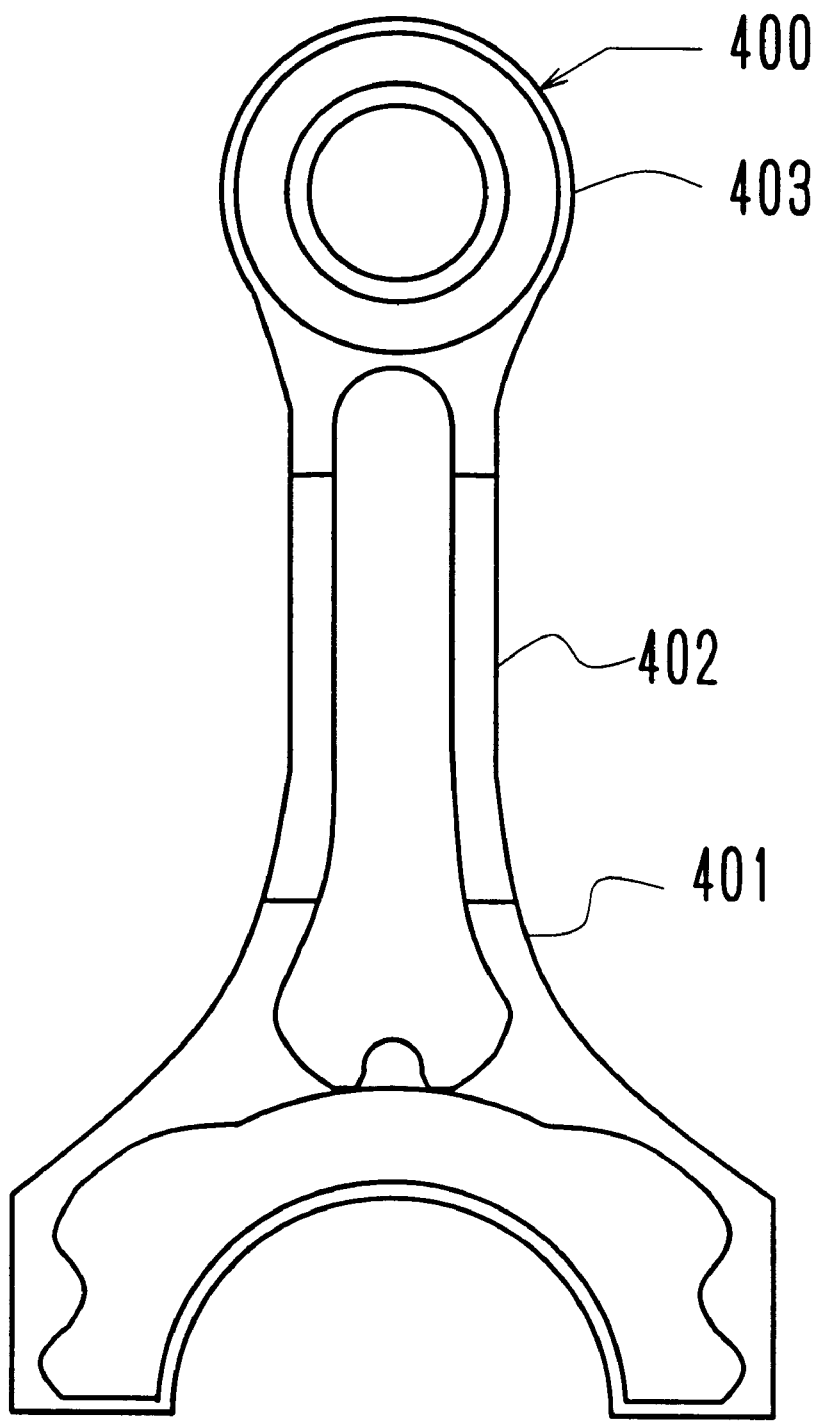
FIG. 22 is a plan view showing a general conrod.

FIG. 21 shows a block diagram of the information processing unit 3. As shown in FIG. 21, the information processing unit 3 includes a storage media reading unit 70 for reading the kit model 21 and program 12 stored in the storage media 2 for producing three-dimensional model, and a main memory 10 in which an operating system 11 is stored. The information processing unit 3 also includes a hard disk 20 for storing the kit model 21, a display 30 for displaying the kit model 21, a mouse 40 for inputting on the display 30 modification information 15a for the kit model 21. Also, the information processing unit 3 includes a key board 50 for entering dimension value data of the kit model 21 and a CPU 60 for controlling execution of the program 12 for producing three-dimensional model.

When the storage media 2 for producing a three-dimensional model is inserted into the storage media reading unit 70, the kit model 21 which is stored in a data area 300 of the storage media 2 for producing a three-dimensional model is read by the storage media reading unit 70 and is stored into the hard disk 20. The program 12 stored in a program area 301 of the storage media 2 for producing a three-dimensional model is also read by the storage media reading unit 70 and is stored into the main memory 10.

The constitution of the information processing unit 3 is substantially the same as the three-dimensional CAD system 1 which is shown in FIG. 1. Accordingly, the process contents for executing the program 12 for producing a three-dimensional model by the information processing unit 3 are the same as those for the three-dimensional CAD system 1 described above. Therefore, the process contents of the program 12 for forming a three-dimensional model are not reiterated here.

As specifically described above, with the three-dimensional CAD system and the three-dimensional model producing method according to the present invention, when a designer inputs modification information for a kit model in order to produce a desired design, the kit model may be modified based on the modification information. Thus, by providing a three-dimensional figure called a kit model and modifying the kit model, designing utilizing a three-dimensional figure at an early stage of devising and materializing a design is made possible. As a result, efficiency of the designing of a three-dimension model is significantly improved.

Further, with a storage media for producing a three-dimensional model, a kit model is readily modified by executing the three-dimensional model producing program which is stored in the program area. When a designer inputs modification information of a kit model to modify it in accordance with his or her preference and taste, the kit model is modified based on the modification information. Thus, by providing three-dimensional figures called kit models, and producing a design by modifying a kit model, designing utilizing a three-dimensional figure at an early stage of devising and materializing a design is made possible. As a result, efficiency of the designing of a three-dimension model is significantly improved.

The above disclosure is intended as merely exemplary, and not to limit the scope of the invention, which is to be determined by reference to the appended claims.

What is claimed is:

1. A three-dimensional CAD system comprising:
    a storage for storing a kit model of a geometric structure of an object article to be designed, said kit model having,
        geometric shape data which includes elements such as points, curved lines and curved surfaces,
        correlation data which indicates usage relationships between the elements, and
        generation data which defines generation relationships between the elements;
    a display unit for displaying the kit model;
    an input unit for entering modification information indicating modification to be made to an element of the kit model displayed on the display unit; and
    a modification unit for modifying the kit model by determining based on the correlation data the relevant elements to the element being modified, and associatively regenerating the relevant elements based on the generation data for the relevant elements.

2. A three-dimensional CAD system of claim 1 wherein:
    the modification information includes information for moving or changing an object line which is selected from curved lines of the kit model, and
    said modification unit moves or changes the object line based on the modification information and, as the object line is modified, associatively modifies all the points, curved lines and curved surfaces intersecting the object line.

3. A three-dimensional CAD system of claim 1 wherein:
    the modification information includes information for adding or deleting an object line to or from said kit model, and
    said modification unit adds or deletes the object line to or from the kit model based on the modification information and, as the object line is modified, assotiatively modifies all the points, curved lines and curved surfaces intersecting the object line.

4. A three-dimensional CAD system of claim 1 wherein:

the correlation data includes data for indicating use and used relationship between the curved surface of the kit model and the curved lines of the boundaries of the curved surface as well as data indicating use and used relationship between the curved lines of the boundaries and the points on the curved lines, and said modification unit modifies the kit model based on the correlation data.

5. A method of producing a three-dimensional model comprising the steps of:

displaying a kit model on a display, the kit model indicating geometric structure of an object article to be designed and having geometric shape elements such as points, curved lines and curved surfaces as well as correlation data indicating correlation of the geometric shape elements, the correlation data including data on usage relationships between the shape elements;

receiving modification information which specifies change to be made to one or more of the shape elements of the kit model displayed on said display; and modifying the kit model by determining relevant shape elements to said one or more of the shape elements based on the correlation data and associatively regenerating the relevant shape elements based on generation relationships therebetween.

6. A method of producing a three-dimensional model of claim 5 wherein:

the modification information includes information for moving or changing an object line which is selected from curved lines of the kit model; and in the step of modifying the kit model, the object line is added or deleted based on the modification information and, as the object line is modified, all points, curved lines and curved surfaces intersecting the object line are associatively modified.

7. A method of producing a three-dimensional model of claim 5 wherein:

the modification information includes information for adding or deleting an object line to or from the kit model; and in the step of modifying the kit model, the object line is added or deleted to or from said kit model based on the modification information and, as said object line is modified, all points, curved lines and curved surfaces intersecting the object line are modified.

8. A method of producing a three-dimensional model of claim 5 wherein:

the correlation data includes data representing use and used relationship between the curved surface of the kit model and the curved lines which are boundaries of the curved surface, as well as data representing use and used relationship between the curved lines of the boundaries and the points on the curved lines; and the step of modifying the kit model modifies the kit model based on the correlation data.

9. A computer readable storage media for producing a three-dimensional model which has a data area for storing data and a program area for storing programs, the program being executable with an information processor using the data, said storage media comprising:

data area for storing a kit model indicating a geometric structure of an object article to be designed and having geometric shape elements such as points, curved lines and curved surfaces as well as correlation data indicating correlation of the geometric shape elements, the correlation data including data on usage relationships between the shape elements, and generation data which define generation relationships between the shape elements, and said program area storing a program for producing a three-dimensional model, the program including a display routine for displaying the kit model on a display, an input routine for receiving entry of modification data which specifies change to be made to one or more of the shape elements of the kit model displayed on a display, and a modification routine for modifying the kit model based on the modification data by determining the relevant shape elements to said one or more of the shape elements based on the correlation data, and associatively changing said relevant shape elements using a regeneration function which regenerates the relevant shape elements based on the generation data.

10. A storage media for producing a three-dimensional model of claim 9 wherein:

the modification data includes information for moving or changing an object line which is selected from curved lines of the kit model, the modification routine adds or deletes the object line based on said modification data and modifies all points, curved lines and curved surfaces which intersect the object line.

11. A storage media for producing a three-dimensional model of claim 9 wherein:

the modification data received by the input routine includes information for adding or deleting an object line to or from the kit model, said modification routine adds or deletes the object line to or from the kit model based on the modification data and, as the object line is modified all points, curved lines and curved surfaces intersecting the object line are modified.

12. A storage media for producing a three-dimensional model of claim 9 wherein:

the correlation data includes data indicating use and used relationship between the curved surface of the kit model and the curved lines of the boundaries of the curved surface as well as data indicating use and used relationship between the curved lines of the boundaries and the points on the curved lines, and said modification routine modifies the kit model based on the correlation data.

* * * * *